(12) United States Patent
Darshan et al.

(10) Patent No.: US 7,145,439 B2
(45) Date of Patent: Dec. 5, 2006

(54) POWERED DEVICE INTERFACE CIRCUIT

(75) Inventors: Yair Darshan, Petach Tikva (IL); Alon Ferentz, Bat Yam (IL); Dan Admon, Kiryat Tivon (IL); Yossi Shanava, Ramat Gan (IL); Roni Blaut, Netanya (IL); Poldi Rimboim, Ashdod (IL)

(73) Assignee: PowerDsine, Ltd., Hod Hasharon (IL)

( * ) Notice: Subject to any disclaimer, the term of this patent is extended or adjusted under 35 U.S.C. 154(b) by 148 days.

(21) Appl. No.: 10/961,108

(22) Filed: Oct. 12, 2004

(65) Prior Publication Data

US 2005/0086546 A1 Apr. 21, 2005

Related U.S. Application Data

(60) Provisional application No. 60/512,362, filed on Oct. 16, 2003.

(51) Int. Cl.
*H04M 11/04* (2006.01)

(52) U.S. Cl. ............................. 340/310.01; 340/310.02; 340/310.05; 340/310.08; 340/568.2; 340/687; 370/410; 370/908

(58) Field of Classification Search ................................ 340/310.01–310.02, 310.05, 310.08, 568.2, 340/568.4, 687; 370/241, 242, 410, 908; 713/300, 310, 340, 15
See application file for complete search history.

(56) References Cited

U.S. PATENT DOCUMENTS

| 6,115,468 | A | 9/2000 | De Nicolo |
| 6,140,911 | A | 10/2000 | Fisher et al. |
| 6,473,608 | B1 | 10/2002 | Lehr et al. |
| 6,496,103 | B1 | 12/2002 | Weiss et al. |
| 6,535,983 | B1 | 3/2003 | McCormack et al. |
| 6,643,566 | B1 | 11/2003 | Lehr et al. |
| 6,650,622 | B1 | 11/2003 | Austerman, III et al. |
| 6,909,943 | B1 * | 6/2005 | Lehr et al. ................... 700/286 |
| 6,954,708 | B1 * | 10/2005 | Rakshani et al. ............. 702/79 |
| 6,996,458 | B1 * | 2/2006 | Pincu et al. ................. 700/297 |
| 2003/0072438 | A1 | 4/2003 | Le Creff et al. |

(Continued)

FOREIGN PATENT DOCUMENTS

WO WO99/53627 10/1999

(Continued)

OTHER PUBLICATIONS

IEEE 802.3af-2003 Standard—"Data Terminal Equipment Power via Media Dependent Interface"; IEEE New York; Jun. 18, 2003.

*Primary Examiner*—Hung Nguyen
(74) *Attorney, Agent, or Firm*—Simon Kahn

(57) ABSTRACT

A method for communicating multi-bit data from a powered device being powered over communication cabling to power sourcing equipment, the method comprising: exhibiting a signature indicative of a device to be powered over communication cabling; sensing a voltage level indicative of remote powering over communication cabling; prior to connecting power to operational circuitry, transmitting first multi-bit information; subsequently to the transmitting first multi-bit information, connecting power received over the communication cabling to the operational circuitry; receiving information from the operational circuitry; subsequent to receiving the information disconnecting the received power from the operational circuitry; subsequent to the disconnecting, transmitting second multi-bit information associated with the operational circuitry, the second multi-bit information comprising at least one bit being a function of the received information; and re-connecting power received over the communication cabling to the operational circuitry.

47 Claims, 12 Drawing Sheets

U.S. PATENT DOCUMENTS

2003/0107269 A1   6/2003   Jetzt
2003/0185169 A1   10/2003  Higgins
2004/0062203 A1   4/2004   Austerman, III et al.

FOREIGN PATENT DOCUMENTS

WO  PCT/IL2004/000944   10/2003

* cited by examiner

POWERED DEVICE INTERFACE CIRCUIT

RELATED APPLICATIONS

This application claims priority from U.S. Provisional Patent Application Ser. No. 60/512,362 filed Oct. 16, 2003 entitled "POWERED DEVICE ASIC" the contents of which are incorporated herein by reference.

BACKGROUND OF THE INVENTION

The invention relates generally to the field of power over local area networks, particularly Ethernet based networks, and more particularly to a method of communicating from a powered device to associated power sourcing equipment.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to: reduced cost of installation; centralized power and power back-up; and centralized security and management.

The IEEE 802.3af-2003 standard, whose contents are incorporated herein by reference, is addressed to powering remote devices over an Ethernet based network. Power can be delivered to the powered device (PD) either directly from the switch/hub known as an endpoint power sourcing equipment (PSE) or alternatively via a midspan PSE.

The above mentioned standard prescribes a detection protocol to distinguish a compatible PD from non-compatible devices and precludes the application of power and possible damage to non-compatible devices. An optional classification protocol is prescribed, which enables classification of the power requirements of the PD to one of 5 classes. Of the 5 classes specified, 3 classes result in maximum power levels of the standard, namely 15.4 Watts at the output of the PSE. Thus, only 3 levels of power are supported by the classification protocol namely 4.0 Watts, 7.0 Watts and 15.4 Watts. Power is to be reserved by the PSE in accordance with the classification detected by the protocol.

The term PD comprises a LAN node receiving power over the communication equipment. In a typical application, PD interface circuitry enabling the detection and optional classification is supplied. Power is isolated by the PD interface circuitry from the PD operational circuitry through an isolating switch, and is enabled to the PD operational circuitry only after the voltage at the PD, supplied from the PSE, rises to $V_{on}$. One function of the PD interface circuitry is thus to close the isolating switch thus enabling operation of the PD operational circuitry. In a typical application, the output of the isolating switch is fed to the input of a DC/DC converter, and the output of the DC/DC converter powers the PD operational circuitry.

The standard further prescribes a maximum turn on time, designated $t_{pon}$. In the event that the PSE powers the PD, power is to be supplied and a minimum current draw of 10 mA is to be monitored within $t_{pon}$ after completion of detection. After $t_{pon}$ a disconnect detection function is to be active.

No method of communicating information between the PD and the PSE is provided other than that provided by the detection and optional classification protocol. Thus, in the event that the PD power requirements are between the power levels supported by the classification protocol, power is to be reserved in excess of the actual power requirements. An increase in granularity would improve the overall power management of the PSE, and enable a larger number of PDs having power requirements less than the maximum power to be supported by a given PSE. Communication between the PD and the PSE would further enable the transfer of information such as PD temperature, priority of the PD, results of internal PD testing, PD configuration and PD type. Such information would advantageously enable improved power management and powering decisions.

U.S. Pat. No. 6,473,608 entitled "Structure Cabling System" issued Oct. 29, 2002 to Lehr et al. and U.S. Pat. No. 6,643,566 entitled "System for Power Delivery Over Data Communication Cabling Infrastructure" issued Nov. 4, 2003 to Lehr et al. the contents of both of which are incorporated herein by reference are addressed to the issue of supplying power to a PD over an Ethernet based network. No method of communication is described, and in particular no method of supplying increased classification granularity is described.

It would therefore be desirable to have a method of communicating from a PD to associated PSE, while meeting the requirements of IEEE 802.3af. Preferably, the method would enable communication of data comprising increased granularity regarding power requirements, and preferably is unrestricted as to transmission rate.

SUMMARY OF THE INVENTION

Accordingly, it is a principal object of the present invention to overcome the disadvantages of prior art PD powering. This is provided in the present invention by communicating information from a PD interface circuitry to an associated PSE while not enabling the operation of the PD operational circuitry, in particular by not enabling a DC/DC converter of the PD operational circuitry. In one embodiment, communication occurs after the PSE enables turn on of the PD by supplying an appropriate voltage; however an isolating switch between the PD interface circuitry and the PD operational circuitry is kept open.

In particular the invention provides for a method for communicating multi-bit data from a powered device being powered over communication cabling to power sourcing equipment, the method comprising: exhibiting a signature indicative of a powered device to be powered over communication cabling; sensing a voltage level indicative of remote powering over the communication cabling; and prior to connecting power to operational circuitry of the powered device, transmitting multi-bit information over the communication cabling.

In one embodiment the method further comprises subsequently to the transmitting, connecting power received over the communication cabling the operational circuitry.

In another embodiment the transmitting multi-bit information is accomplished by modulating a current flow responsive to the sensed voltage level. In one further embodiment the modulating of the current flow comprises impressing at least 2 current levels, the level and timing of the at least 2 current levels being sufficient to ensure that a valid maintain power signature is detected. In another further embodiment the modulating of the current flow comprises impressing at least 3 current levels, the level and timing of the at least 3 current levels being sufficient to ensure that a valid maintain power signature is detected.

In one embodiment the multi-bit information comprises data indicative of a maximum power level. In one further embodiment the data indicative of a maximum power level exhibits a granularity of no more than 1 watt over at least a portion of the range of maximum power levels.

In one embodiment the information comprises data indicative of temperature.

The invention also provides for a method of powering a powered device from power sourcing equipment over communication cabling and communicating from the powered device to power sourcing equipment, the method comprising: exhibiting a signature indicative of a device to be powered over communication cabling; sensing a voltage level indicative of remote powering over communication cabling; transmitting multi-bit information; and subsequently to the transmitting, connecting power received over communication cabling to powered device operational circuitry.

In one embodiment, the method further comprises before the sensing: presenting a classification signature. In another embodiment the transmitting multi-bit information is accomplished by modulating a current flow responsive to the sensed voltage level. In one further embodiment the modulating of the current flow comprises impressing at least 2 current levels. In a yet further embodiment the level and timing of the impressed at least 2 current levels is sufficient to ensure that a valid maintain power signature is detected. In another further embodiment the modulating of the current flow comprises impressing at least 3 current levels.

In one embodiment the multi-bit information comprises data indicative of a maximum power level. In another embodiment the information comprises data indicative of temperature.

The invention also provides for a method for communicating multi-bit data from a powered device being powered over communication cabling to power sourcing equipment, the method comprising: exhibiting a signature indicative of a device to be powered over communication cabling; sensing a voltage level indicative of remote powering over communication cabling; prior to connecting power to operational circuitry, transmitting first multi-bit information; subsequently to the transmitting first multi-bit information, connecting power received over the communication cabling to the operational circuitry; receiving information from the operational circuitry; disconnecting the received power from the operational circuitry; subsequent to the disconnecting, transmitting second multi-bit information associated with the operational circuitry, the second multi-bit information comprising at least one bit being a function of the received information.

In one embodiment the method further comprises after the transmitting second multi-bit information: re-connecting power received over the communication cabling to the operational circuitry. In another embodiment one of the transmitting first multi-bit information and transmitting second multi-bit information is accomplished by modulating a current flow responsive to the voltage level. In one further embodiment the modulating of the current flow comprises impressing at least 2 current levels. In a yet further embodiment the level and timing of the at least 2 current levels is sufficient to ensure that a valid maintain power signature is detected. In another further embodiment the modulating of the current flow comprises impressing at least 3 current levels.

In another embodiment the second multi-bit information comprises data indicative of one of temperature, results of built in testing, priority, type and maximum power draw. In another embodiment the first multi-bit information comprises data indicative of a maximum power level. In a further embodiment the data indicative of a maximum power level exhibits a granularity of no more than 1 watt over at least a portion of the range of maximum power levels.

In another embodiment the method further comprises subsequent to the disconnecting: operating one of a PWM and a resonance controller to discharge an input capacitor. In another embodiment the method further comprises subsequent to the disconnecting: operating at least one of a PWM controller, a resonance controller, the signature indicative of a powered device, and a classification signature to discharge an input capacitor. In yet another embodiment the method further comprises: maintaining a valid MPS signature between the disconnecting and the transmitting.

The invention also provides for a powered device interface circuit comprising: a control circuit; means for exhibiting a signature impedance to power sourcing equipment connected over a communication cabling, the means being responsive to the control circuit; a voltage sensor in communication with the control circuit; an isolating switch operating means responsive to the control circuit; and means for transmitting first multi-bit information over the communication cabling, the means being responsive to the control circuit, the control circuit being operable to transmit the first multi-bit information over the communication cabling through the means for transmitting prior to operating the isolating switch operating means to close an isolating switch.

In one embodiment the powered device interface circuit further comprises means for exhibiting a classification signature, the classification signature being indicative of a maximum total power consumption of the powered device operational circuitry, the means being responsive to the control circuit. In another embodiment the powered device interface circuit further comprises a variable impedance responsive to the control circuit, the control circuit varying the variable impedance thereby transmitting the first multi-bit information. In a further embodiment the control circuit is operable to vary the variable impedance to at least two values.

In one embodiment the powered device interface circuit further comprises a variable current source responsive to the control circuit, the control circuit varying the current variable current source thereby transmitting the first multi-bit information. In a further embodiment the control circuit is operable to vary the variable current source to at least 2 current values, the value and timing of the at least 2 current values being sufficient to ensure that a valid maintain power signature is detected. In a yet further embodiment the controller is operable to vary the variable current source to at least 3 current values, the values and timing of the at least 3 current values being sufficient to ensure that a valid maintain power signature is detected.

In another embodiment the first multi-bit information comprises data indicative of a maximum power level. In a further embodiment the data indicative of a maximum power level exhibits a granularity of less than or equal to 1 watt over at least a portion of the range of available maximum power levels.

In another embodiment the powered device interface circuit further comprises operational circuitry receiving power responsive to the isolating switch being closed, wherein the control circuit is further operable to: close the isolating switch; receive data from the operational circuitry; open the isolating switch thereby disconnecting the received power from the operational circuitry; transmit second multi-bit information comprising an indication of the received data over the communication cabling; and subsequently to transmitting the second multi-bit information close the isolating switch thereby reconnecting the received power to the operational circuitry.

In one further embodiment the second multi-bit information comprises data regarding one of temperature, results of built in testing, priority, maximum current draw and type. In another further embodiment the powered device interface circuit further comprises one of a PWM and a resonance controller responsive to the control circuit, wherein the control circuit is further operable to operate the one of a PWM and a resonance controller after opening the isolating switch and prior to the transmitting second multi-bit information, whereby the one of a PWM and a resonance controller discharges an input capacitor thereby enabling the transmitting of the second multi-bit information. In another further embodiment the powered device interface circuit further comprises means for exhibiting a classification signature, wherein the control circuit is further operable to operate at least one of the means for exhibiting a signature impedance and the means for exhibiting a classification signature after opening the isolating switch and prior to the transmitting second multi-bit information, whereby the at least one of the means for exhibiting a signature impedance and the means for exhibiting a classification signature discharges an input capacitance thereby enabling the transmitting of the second multi-bit information.

The invention independently provides for a local area network comprising: power sourcing equipment; a powered device; communication cabling connecting the power sourcing equipment to the powered device; the powered device comprising a powered device interface circuit comprising: (a) a control circuit; (b) means responsive to the control circuit for exhibiting a signature impedance to the power source equipment over the communication cabling, the power sourcing equipment supplying power to the powered device via the communication cabling responsive to the exhibited signature impedance; (c) an isolating switch responsive to the control circuit, the control circuit being operable to transmit multi-bit information over the communication cabling to the power sourcing equipment prior to operating the isolating switch connecting the power supplied from the power sourcing equipment via the communication cabling to powered device operational circuitry.

The invention also independently provides for a method for communicating multi-bit data from a powered device being powered over communication cabling to power sourcing equipment, the method comprising: exhibiting a signature indicative of a device to be powered over communication cabling; sensing a voltage level indicative of remote powering over communication cabling; and prior to connecting power to operational circuitry, transmitting multi-bit information.

The invention also provides for a method for communicating multi-bit data from a powered device being powered over communication cabling to power sourcing equipment, the method comprising: exhibiting a signature indicative of a device to be powered over communication cabling; sensing a voltage level indicative of remote powering over communication cabling; prior to connecting power to associated operational circuitry, transmitting first multi-bit information; subsequently to the transmitting first multi-bit information, connecting power received over the communication cabling to the associated operational circuitry; disconnecting the power received over the communication cabling from the associated operational circuitry; and subsequent to the disconnecting, transmitting second multi-bit information indicative of at least one characteristic of the associated operational circuitry.

The invention also provides for a method for communicating multi-bit data from a powered device being powered over communication cabling to power sourcing equipment, the method comprising: exhibiting a signature indicative of a device to be powered over communication cabling; sensing a voltage level indicative of remote powering over communication cabling; prior to connecting power to associated operational circuitry, transmitting first multi-bit information; subsequently to the transmitting first multi-bit information, connecting power received over the communication cabling to the associated operational circuitry; ensuring a valid maintain power signature; disconnecting the power received over the communication cabling from the associated operational circuitry; and subsequent to the disconnecting, transmitting second multi-bit information indicative of at least one characteristic of the associated operational circuitry.

The invention also provides for an integrated circuit for use with a powered device comprising: (a) a control circuit; (b) means responsive to the control circuit for exhibiting a signature impedance; (c) isolating switch operating means responsive to the control circuit, the control circuit being operable to transmit multi-bit information over communication cabling to power sourcing equipment prior to operating the isolating switch operating means to connect power supplied from power sourcing equipment via communication cabling to powered device operational circuitry.

The invention also provides for power sourcing equipment for use with a powered device, the power sourcing equipment detecting transmitted multi-bit information being transmitted prior to powering powered device operational circuitry, the transmission being accomplished by a varying current.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 7b illustrates a high level flow chart of an embodiment of the operation of the control of FIG. 7a.

DETAILED DESCRIPTION OF THE PREFERRED EMBODIMENTS

Figure 1A:
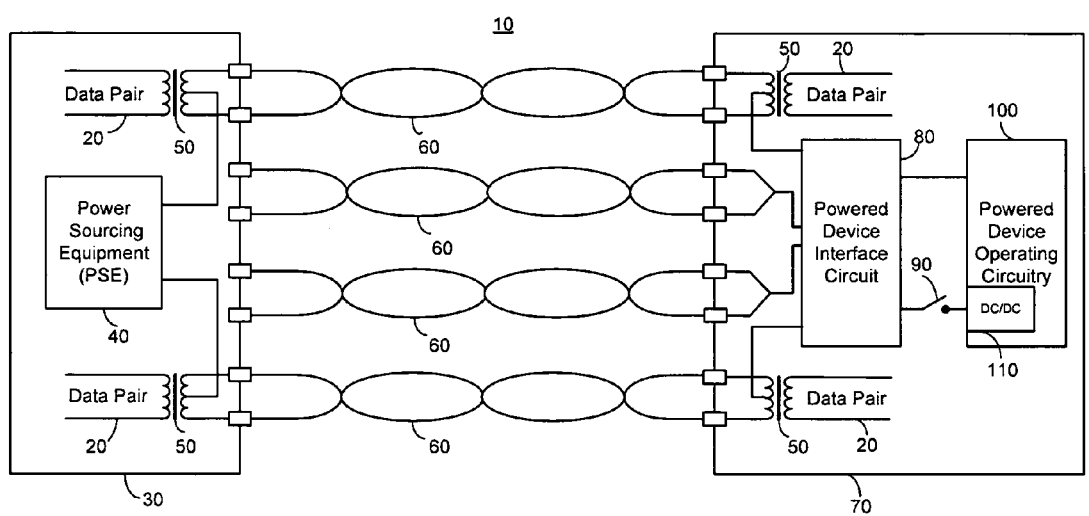
FIG. 1a illustrates a high level block diagram of a first alternative network configuration for remote powering from an endpoint PSE known to the prior art.

The present embodiments enable the transmission of information from PD interface circuitry to an associated PSE prior to supplying power to PD operational circuitry, in particular by not enabling a DC/DC converter of the PD operational circuitry. In one embodiment, communication occurs after the PSE enables the PD by supplying an appropriate voltage; however an isolating switch between the PD interface circuitry and the PD operational circuitry is kept open.

In another embodiment, subsequent to the communication, the isolating switch is closed thereby enabling the PD operational circuitry. Data is received by the PD interface circuitry from the PD operational circuitry, and subsequently the isolating switch is again opened, thereby disabling the PD operational circuitry. Data indicative of the information received from the PD operational circuitry is then communicated by the PD interface circuitry while the PD operational circuitry is disabled. The isolating switch is subsequently again closed thereby enabling the PD operational circuitry. The invention also enables a PSE operable to decipher the communication from the PD interface circuitry.

PD operational circuitry in accordance with the invention may comprise any of a: desktop computer; web camera; facsimile machine; IP telephone; computer; server; wireless LAN access point; emergency lighting system element; paging loudspeaker; CCTV camera; alarm sensor; door entry sensor; access control unit; laptop computer; hub; switch; router; monitor; memory back up unit for workstation; and memory back up unit for a computer.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3af compliant device preferably employing a 10Base-T, 100Base-T or 1000Base-T connection.

FIG. 1a illustrates a high level block diagram of a first alternative network configuration 10 for remote powering from an endpoint PSE known to the prior art. Network configuration 10 comprises: switch/hub equipment 30 comprising first and second data pairs 20, PSE 40, and first and second transformers 50; first, second, third and fourth twisted pair connections 60; and powered end station 70 comprising third and fourth transformers 50, third and fourth data pairs 20, powered device interface circuit 80, switch 90 and powered device operating circuitry 100. Powered device operating circuitry 100 preferably comprises DC/DC converter 110, which typically comprises a high value input capacitor.

The primary of each of first and second transformers 50 carry respective data pairs 20. First and second outputs of PSE 40 are respectively connected to the center tap of the secondary of first and second transformers 50. The output leads of the secondary of first and second transformers 50 are respectively connected to a first end of first and second twisted pair connections 60. The second end of first and second twisted pair connections 60, are respectively connected to the primary of third and fourth transformers 50 located within powered end station 70. The center tap of the primary of each of third and fourth transformers 50 is connected to a respective input of power device interface circuit 80. A first output of powered device interface circuit 80 is connected to powered device operating circuitry 100 through switch 90 at the input to DC/DC converter 110. A second output of powered device interface circuit 80 is connected to powered device operating circuitry 100 as a return. The secondary of each of third and fourth transformers 50 carry third and fourth data pairs 20, respectively.

In operation, PSE 40 supplies power over first and second twisted pair connection 60, thus supplying both power and data over first and second twisted pair connections 60 to powered device interface circuit 80. Third and fourth twisted pair connections 60 are not utilized, and are thus available as spare connections. Third and fourth twisted pair connections 60 are shown connected to powered device interface circuit 80 to allow operation alternatively in a manner that will be described further hereinto below in relation to FIG. 1*b* over unused third and fourth twisted pair connections 60. Powered device interface circuit 80 enables detection and classification in accordance with the relevant standard, preferably IEEE 802.3 af-2003. Once power is supplied by PSE 40 to power device interface circuit 80, power device interface circuit 80 operates switch 90 to enable operation of powered device operating circuitry 100. DC/DC converter 110 is illustrated at the input to powered device operating circuitry 100, however this is not meant to be limiting in any way. DC/DC converter 110 may be located externally of powered device operating circuitry 100, within powered device interface circuit 80 or in one embodiment may not appear.

Figure 1B:
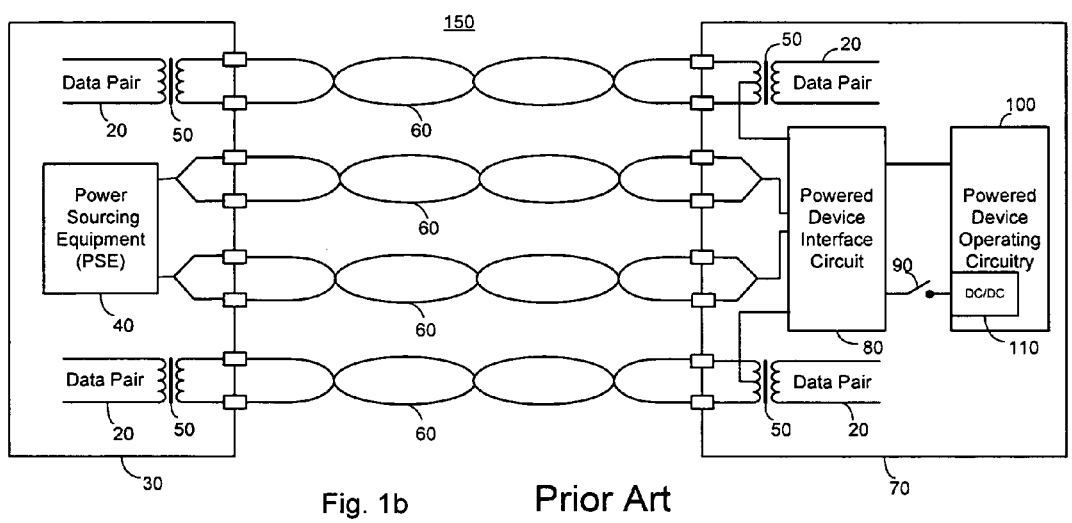
FIG. 1b illustrates a high level block diagram of a second alternative network configuration for remote powering from an endpoint PSE known to the prior art.

FIG. 1*b* illustrates a high level block diagram of a second alternative network configuration 150 for remote powering from an endpoint PSE known to the prior art. Network configuration 150 comprises: switch/hub equipment 30 comprising first and second data pairs 20, PSE 40 and first and second transformers 50; first, second, third and fourth twisted pair connections 60; and powered end station 70 comprising third and fourth transformers 50, third and fourth data pairs 20, powered device interface circuit 80, switch 90 and powered device operating circuitry 100. Powered device operating circuitry 100 preferably comprises DC/DC converter 110, which typically comprises a high value input capacitor.

The primary of each of first and second transformers 50 carry respective data pairs 20. The output leads of first and second transformers 50 are respectively connected to a first end of first and second twisted pair connections 60. A first output of PSE 40 is connected to both leads of third twisted pair connection 60 and a second output of PSE 40, acting as a return, is connected to both leads of fourth twisted pair connection 60. The second end of first and second twisted pair connection 60 is connected to the primary of third and fourth transformer 50, respectively, located within powered end station 70. The center tap of the primary of each of third and fourth transformer 50 is connected to respective inputs of powered device interface circuit 80. The second end of third and fourth twisted pair connections 60 are respectively connected to a first and second input of powered device interface circuit 80. A first output of powered device interface circuit 80 is connected to powered device operating circuitry 100 through switch 90 at the input to DC/DC converter 110. A second output of powered device interface circuit 80 is connected to powered device operating circuitry 100 as a return. The secondary of each of third and fourth transformers 50 carry third and fourth data pairs 20, respectively.

In operation PSE 60 supplies power to powered device interface circuit 80 over third and fourth twisted pair connection 60, with data being supplied over first and second twisted pair connection 60. Power and data are thus supplied over separate connections, and are not supplied over a single twisted pair connection. The center tap connection of third and fourth transformer 50 is not utilized, but is shown connected in order to allow operation alternatively as described above in relation to FIG. 1*a*. The configurations of FIG. 1*a* and FIG. 1*b* thus allow for powering of powered end station 70 by PSE 40 either over the set of twisted pair connections 60 utilized for data communications, or over the set of twisted pair connections 60 not utilized for data communications.

Figure 1C:
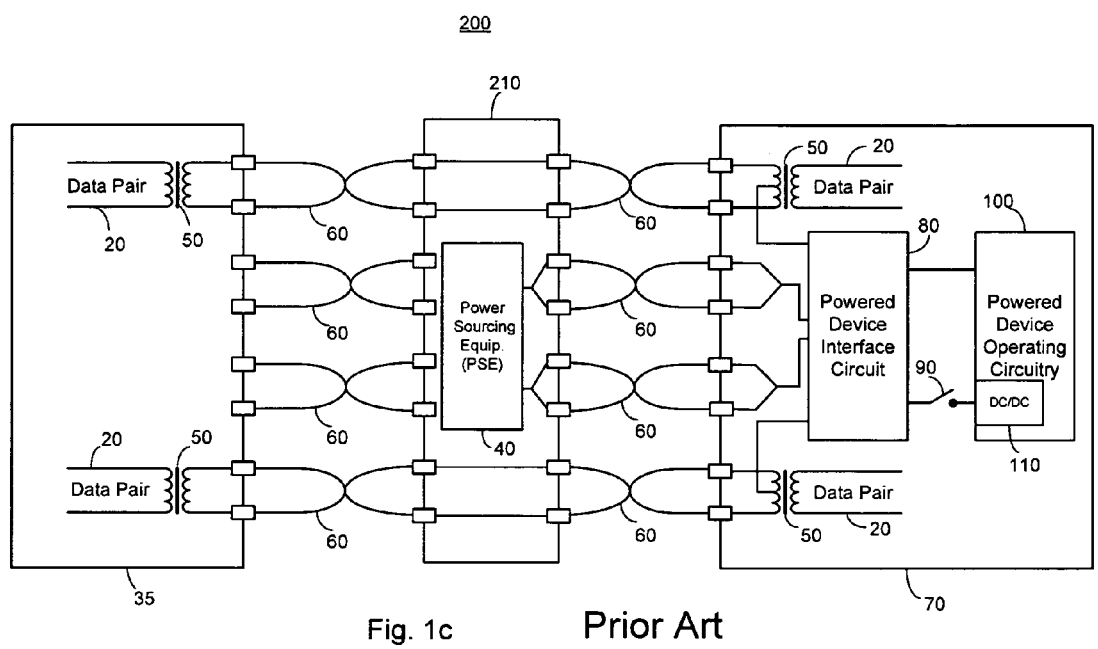
FIG. 1c illustrates a high level block diagram of an alternative network configuration for remote powering from a midspan PSE known to the prior art.

FIG. 1*c* illustrates a high level block diagram of an alternative network configuration 200 for remote powering from a midspan PSE known to the prior art. Network configuration 200 comprises: switch/hub equipment 35 comprising first and second data pairs 20 and first and second transformers 50; first through eighth twisted pair connections 60; midspan power insertion equipment 210 comprising PSE 40; powered end station 70 comprising third and fourth transformers 50, third and fourth data pairs 20, powered device interface circuit 80, switch 90 and powered device operating circuitry 100. Powered device operating circuitry 100 preferably comprises DC/DC converter 110, which typically comprises a high value input capacitor.

The primary of each of first and second transformers 50 carry respective data pairs 20. The output leads of the secondary of first and second transformers 50 are connected, respectively, to a first end of first and second twisted pair connections 60. The second end of first and second twisted pair connections 60 are connected as a straight through connection through midspan power insertion equipment 210 to a first end of fifth and sixth twisted pair connections 60, respectively. A second end of fifth and sixth twisted pair connections 60 are connected to the primary of third and fourth transformer 50, respectively, located within powered end station 70. The secondary of each of third and fourth transformers 50 carry third and fourth data pairs 20, respectively. Third and fourth twisted pair connections 60 are shown connected between switch/hub 35 and midspan power insertion equipment 210, however no internal connection to either third of fourth twisted pair connection is made.

A first output of PSE 40 is connected to both leads of one end of seventh twisted pair connection 60 and a second output of PSE 40, acting as a return, is connected to both leads of one end of eighth twisted pair connection 60. The second end of both leads of both seventh and eighth twisted pair connections 60 respectively, are connected to first and second power inputs of powered device interface unit 80. A first output of powered device interface circuit 80 is connected to powered device operating circuitry 100 through switch 90 at the input to DC/DC converter 110. A second output of powered device interface circuit 80 is connected to powered device operating circuitry 100 as a return. The center tap of the primary of each of third and fourth transformer 50 is connected to respective inputs of powered device interface circuit 80.

In operation PSE 40 of midspan power insertion equipment 210 supplies power to powered end station 70 over seventh and eighth twisted pair connections 60, with data being supplied from switch/hub equipment 35 over first and second twisted pair connections 60 through midspan power insertion equipment 210 to fifth and sixth twisted pair connections 60. Power and data are thus supplied over separate connections, and are not supplied over a single twisted pair connection. The center tap connection of third and fourth transformer 50 is not utilized, but is shown connected in order to allow operation alternatively as described above in relation to FIG. 1a.

Figure 2A:
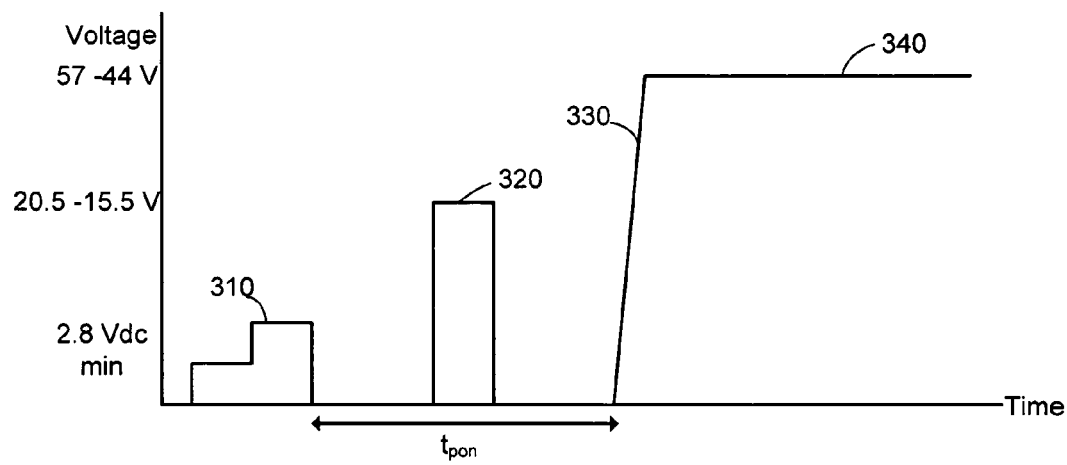
FIG. 2a illustrates detection, classification and turn on voltage timing known to the prior art.

FIG. 2a illustrates a plot of detection, classification and turn on voltage timing known to the prior art in which the x-axis represents time and the y-axis represents port voltage at the output of PSE 40 of FIGS. 1a–1c. Waveform 310 represents a detection voltage waveform, which in an exemplary embodiment is accomplished with 2 voltage levels having a minimum of 2.8 Volts DC and a maximum of 10.1 Volts DC. In a preferred embodiment more than 2 levels are utilized, and a pre-detection voltage is further utilized, as described in co-pending U.S. patent application Ser. No. 10/861,405 filed Jun. 7, 2004 entitled "Pre-detection of Powered Devices" whose contents are incorporated herein by reference. Waveform 310 may last up to 500 milliseconds in accordance with the aforementioned standard.

Waveform 320 represents optional classification of the powered device, and is preferably accomplished after the completion of detection and before powering of the powered device. In an exemplary embodiment, classification is accomplished by supplying a voltage of between 15.5 and 20.5 volts, for up to 75 milliseconds. After completion of the optional classification, and within time $t_{pon}$ of the completion of the detection represented by the end of waveform 310, operative current limited voltage is to be supplied to the powered device. In an exemplary embodiment, time $t_{pon}$ is less than or equal to 400 milliseconds. Waveform 330 represents the voltage rise as the above mentioned current limited voltage is supplied to the powered device. Waveform 340 represents the steady state operating condition, in which a current limited output having a voltage of between 44 and 57 volts DC is supplied by PSE 40. It is to be noted that at the PD a voltage, designated $V_{on}$, is detected as a result.

Figure 2B:
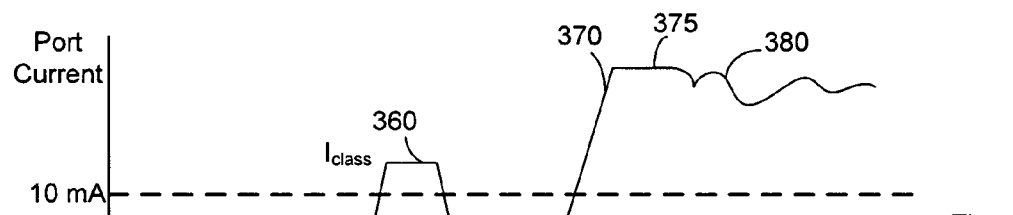
FIG. 2b illustrates classification and turn on current timing known to the prior art.

FIG. 2b illustrates classification and turn on current timing known to the prior art, in which the x-axis represents time and the y-axis represents port current. Waveform 360 represents optional classification current, and is associated with optional classification voltage waveform 320 of FIG. 2a. Waveform 370 represents current sourced to the powered end station 70, and is associated with current limited voltage waveform 330 of FIG. 2a. Waveform 370 is shown rising in a linear fashion to following which waveform 375 shows current limited charging of the high value input capacitance of DC/DC converter 110. After charging of the high value input capacitance, waveform 380 represents the port current fluctuations typically associated with current flow to the input of DC/DC converter 110 of powered device operating circuitry 100 of FIGS. 1a–1c. Waveforms 375 and 380 are associated with current limited voltage waveform 340 of FIG. 2a. The shapes of waveforms 370, 375 and 380 are not meant to be limiting in any way, and the operating current waveforms 370 and 380 may exhibit any shape without exceeding the scope of the invention. Preferably, the current as represented by waveform 375 and 380 remains with the confines of the requirements of the applicable standard to prevent PSE 40 from removing power due to the absence of a valid maintain power signature (MPS) component. In an exemplary embodiment the current as depicted by waveforms 375 and 380 meets or exceeds 10 mA for at least 60 ms of every 300 ms period thus presenting a valid MPS component.

Figure 3A:
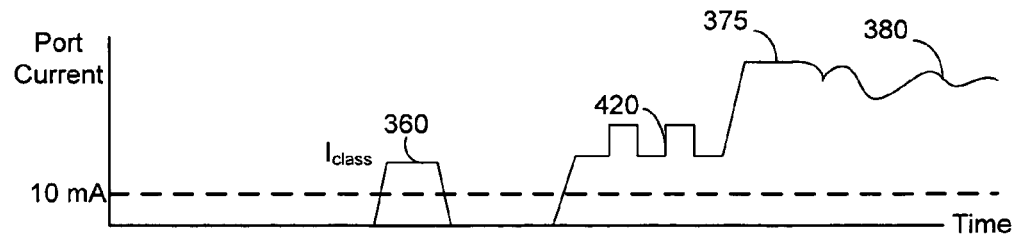
FIG. 3a illustrates timing of classification, communication and turn on current of a first embodiment exhibiting two levels in accordance with a principle of the current invention.

FIG. 3a illustrates timing of classification, communication and turn on current of a first embodiment exhibiting two levels of current in accordance with a principle of the current invention in which the x-axis represents time and the y-axis represents port current. Waveform 360 represents optional classification current, and is associated with optional classification voltage waveform 320 of FIG. 2a. Waveform 420 represents data communication from powered device interface circuit 80 to PSE 40 via 2 current levels. It is to be noted that the 2 current levels are herein illustrated as being above 10 mA, thus ensuring a valid MPS component, however this is not meant to be limiting in any way. One of the current levels may be less than 10 mA, zero, or negative without exceeding the scope of the invention. In an exemplary embodiment communication as represented by waveform 420 is of a duration less than 300 ms, thus a valid MPS component is ensured by valid powered device circuitry having a power draw in excess of 10 mA. Waveform 420 is associated with voltage waveform 340 of FIG. 2a, and is representative of current based communication after voltage at the PD supplied from PSE 40 rises to $V_{on}$. PSE 40 is operational to detect the current fluctuation and received the communication from powered device interface circuit 80.

Data communication from powered device interface circuit 80 to PSE 40 is illustrated as being in a unilateral direction, however this is not meant to be limiting in any way. PSE 40 may also communication with data interface circuit 80 without exceeding the scope of the invention. Preferably, powered device interface circuit 80 communicates with PSE 40 prior to closing switch 90, thus DC/DC converter 100 is not powered and its associated noise and high value input capacitance, as describe above in relation to waveforms 375 and 380 of FIG. 2b, is absent. It is to be understood that this requires powered device interface circuit 80 to sink any current and thus minimizing current flow during the communication period as illustrated by waveform 420 is desirable.

After completion of communication as illustrated by waveform 420, operating current is supplied to DC/DC converter 110 by closing switch 90 thereby supplying power to powered device operating circuitry 100 as illustrated by waveforms 375 and 380. Waveforms 375 and 380 are in all respects similar to waveforms 375 and 380 of FIG. 2b, and illustrate typical operating current flows.

Figure 3B:
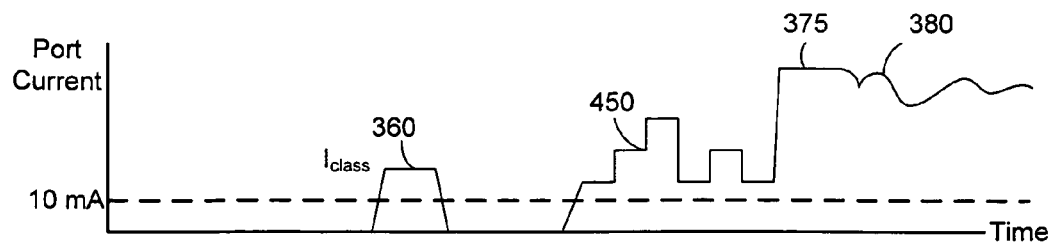
FIG. 3b illustrates timing of classification, communication and turn on current of a first embodiment exhibiting three levels in accordance with a principle of the current invention.

FIG. 3b illustrates timing of classification, communication and turn on current of a first embodiment exhibiting three levels in accordance with a principle of the current invention, in which the x-axis represents time and the y-axis represents port current. Waveform 360 represents optional classification current, and is associated with optional classification voltage waveform 320 of FIG. 2a. Waveform 450 represents data communication from powered device interface circuit 80 to PSE 40 via a plurality of current levels, of which 3 current levels are illustrated. It is to be noted that the 3 current levels are herein illustrated as each being above 10 mA, thus ensuring a valid MPS component, however this is not meant to be limiting in any way. One or more of the current levels may be less than 10 mA, zero, or negative without exceeding the scope of the invention. In an exemplary embodiment communication as represented by waveform 450 is of a duration less than 300 ms, thus a valid MPS component is ensured by valid powered device circuitry having a power draw in excess of 10 mA. Waveform 450 is associated with voltage waveform 340 of FIG. 2a, and is representative of current based communication after voltage at the PD supplied from PSE 40 rises to $V_{on}$. PSE 40 is operational to detect the current fluctuation and received the communication from powered device interface circuit 80.

Data communication from powered device interface circuit 80 to PSE 40 is illustrated as being in a unilateral direction, however this is not meant to be limiting in any way. PSE 40 may also communication with data interface circuit 80 without exceeding the scope of the invention.

Preferably, powered device interface circuit 80 communicates with PSE 40 prior to closing switch 90, thus DC/DC converter 100 is not powered and its associated noise and high value input capacitance as describe above in relation to waveforms 375 and 380 of FIG. 2b, is absent. It is to be understood that this requires powered device interface circuit 80 to sink any current and thus minimizing current flow during the communication period as illustrated by waveform 450 is desirable.

After completion of communication as illustrated by waveform 450, operating current is supplied to DC/DC converter 110 by closing switch 90 thereby supplying power to powered device operating circuitry 100 as illustrated by waveforms 375 and 380. Waveforms 375 and 380 are in all respects similar to waveforms 375 and 380 of FIG. 2b, and illustrate typical operating current flows.

Figure 4A:
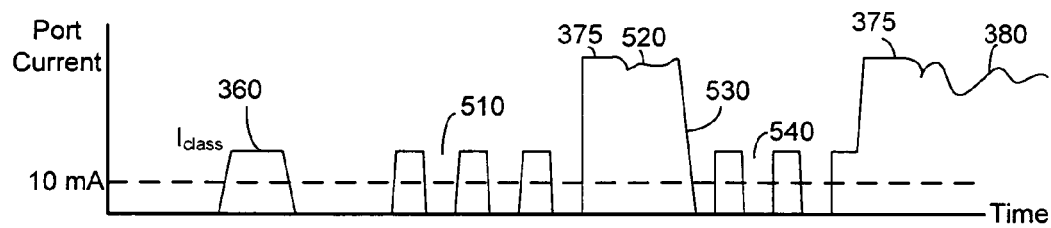
FIG. 4a illustrates timing of classification, communication and turn on current of a second embodiment exhibiting two levels in accordance with a principle of the current invention.

FIG. 4a illustrates timing of classification, communication and turn on current of a second embodiment exhibiting two levels in accordance with a principle of the current invention, in which the x-axis represents time and the y-axis represents port current. Waveform 360 represents optional classification current, and is associated with optional classification voltage waveform 320 of FIG. 2a. Waveform 510 represents data communication from powered device interface circuit 80 to PSE 40 via a plurality of current levels, of which 2 current levels are illustrated. It is to be noted that a first one of the 2 current levels is illustrated as being below 10 mA, illustrated as zero current, with the second one of the 2 current levels being above 10 mA, illustrated as being 20 mA, however this is not meant to be limiting in any way. Preferably the timing and average current of waveform 510 ensures a valid MPS component. In an exemplary embodiment communication as represented by waveform 510 is of a short duration, less than 300 ms and typically on the order of 100 ms, thus a valid MPS component is ensured by valid powered device circuitry having a power draw in excess of 10 mA after completion of communication. Waveform 510 is associated with voltage waveform 340 of FIG. 2a, and is representative of current based communication after voltage at the PD supplied from PSE 40 rises to $V_{on}$. PSE 40 is operational to detect the current fluctuation and received the communication from powered device interface circuit 80. In the exemplary embodiment shown, PSE 40 is operational to detect communication as current levels above and below a predetermined threshold.

Data communication from powered device interface circuit 80 to PSE 40 is illustrated as being in a unilateral direction, however this is not meant to be limiting in any way. PSE 40 may also communication with data interface circuit 80 without exceeding the scope of the invention. Preferably, powered device interface circuit 80 communicates with PSE 40 prior to closing switch 90, thus DC/DC converter 100 is not powered and its associated noise and high value input capacitance, as describe above in relation to waveforms 375 and 380 of FIG. 2b, is absent. It is to be understood that this requires powered device interface circuit 80 to sink any current and thus minimizing current flow during the communication period as illustrated by waveform 510 is desirable.

After completion of communication as illustrated by waveform 510, operating current is supplied to DC/DC converter 110 by closing switch 90 thereby supplying power to powered device operating circuitry 100 as illustrated by waveforms 375 and 520. Waveform 375 is in all respects similar to waveforms 375 of FIG. 2b. Waveform 520 is in all respects similar to waveform 380 of FIG. 2b, and illustrates typical operating current flows. After a start up period illustrated by the time duration of waveform 520, switch 90 is opened as illustrated by waveform end 530 of waveform 520. Thus, operating current is disconnected from DC/DC converter 110, and the attendant noise and high value input capacitance is removed. Waveform end 530 is shown falling to a level equivalent to that of the first current level of waveform 510, however this is not meant to be limiting in any way. Waveform 530 may be reduced to a higher or lower level than the first current level of waveform 510 without exceeding the scope of the invention. Preferably, waveform 530 arrives at a stable operating level prior to further communication.

Waveform 540 represents data communication from powered device interface circuit 80 to PSE 40 via a plurality of current levels, of which 2 current levels are illustrated. Preferably communication begins after waveform 530 has achieved a quiescent stable operation level. It is to be noted that a first one of the 2 current levels is illustrated as being below 10 mA, illustrated as zero current, with the second one of the 2 current levels being above 10 mA, illustrated as being 20 mA, however this is not meant to be limiting in any way. Preferably the timing and average current of waveform 540 ensures a valid MPS component. In an exemplary embodiment communication as represented by waveform 540 is of a short duration, less than 300 ms and typically on the order of 100 ms, thus a valid MPS component is ensured by valid powered device circuitry having a power draw in excess of 10 mA after completion of communication. In the exemplary embodiment shown, PSE 40 is operational to detect communication as current levels above and below a pre-determined threshold. In a further exemplary embodiment the pre-determined threshold is 15 mA.

Data communication from powered device interface circuit 80 to PSE 40 is illustrated during waveform 540 as being in a unilateral direction, however this is not meant to be limiting in any way. PSE 40 may also communication with data interface circuit 80 without exceeding the scope of the invention. It is to be understood that powered device interface circuit 80 sinks any current and thus minimizing current flow during the communication period as illustrated by waveform 540 is desirable.

After completion of communication as illustrated by waveform 540, operating current is again supplied to DC/DC converter 110 by closing switch 90 thereby supplying power to powered device operating circuitry 100 as illustrated by waveforms 375 and 380. Waveforms 375 and 380 are is in all respects similar to waveforms 375 and 380 of FIG. 2b, and illustrates typical operating current flows.

Figure 4B:
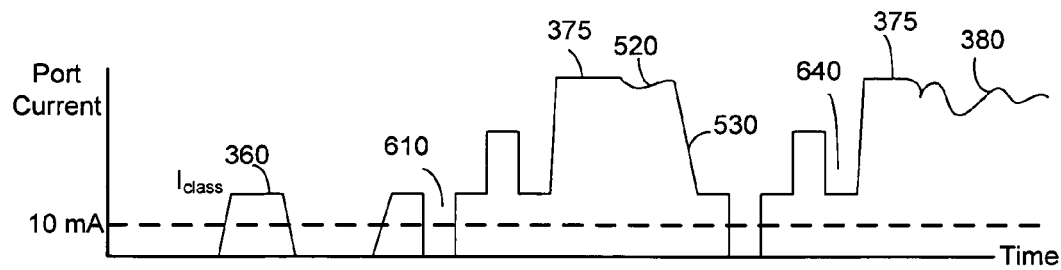
FIG. 4b illustrates timing of classification, communication and turn on current of a second embodiment exhibiting three levels in accordance with a principle of the current invention.

FIG. 4b illustrates timing of classification, communication and turn on current of a second embodiment exhibiting three levels in accordance with a principle of the current invention, in which the x-axis represents time and the y-axis represents port current. Waveform 360 represents optional classification current, and is associated with optional classification voltage waveform 320 of FIG. 2a. Waveform 610 represents data communication from powered device interface circuit 80 to PSE 40 via a plurality of current levels, of which 3 current levels are illustrated. It is to be noted that one of the 3 current levels is illustrated as being zero, with the other 2 current levels being above 10 mA, thus ensuring a valid MPS component, however this is not meant to be limiting in any way. Any one or more of the current levels may be less than 10 mA, zero, or negative without exceeding the scope of the invention. Preferably the timing and average current of waveform 610 ensures a valid MPS component. In an exemplary embodiment communication as represented by waveform 610 is of a duration less than 300 ms, thus a valid MPS component is ensured by valid powered device circuitry having a power draw in excess of 10 mA after communication. Waveform 610 is associated with voltage waveform 340 of FIG. 2*a*, and is representative of current based communication after voltage at the PD supplied from PSE 40 rises to $V_{on}$. In the exemplary embodiment shown, PSE 40 is operational to detect communication at the plurality of current levels.

Data communication from powered device interface circuit 80 to PSE 40 is illustrated as being in a unilateral direction, however this is not meant to be limiting in any way. PSE 40 may also communication with data interface circuit 80 without exceeding the scope of the invention. Preferably, powered device interface circuit 80 communicates with PSE 40 prior to closing switch 90, thus DC/DC converter 100 is not powered and its associated noise and high value input capacitance, as describe above in relation to waveforms 375 and 380 of FIG. 2*b*, is absent. It is to be understood that this requires powered device interface circuit 80 to sink any current and thus minimizing current flow during the communication period as illustrated by waveform 610 is desirable.

After completion of communication as illustrated by waveform 610, operating current is supplied to DC/DC converter 110 by closing switch 90 thereby supplying power to powered device operating circuitry 100 as illustrated by first waveform 375. First waveform 375 is in all respects similar to waveform 375 of FIG. 2*b* and waveform 520 is in all respects similar to waveform 380 of FIG. 2. After a start up period illustrated by the time duration of waveform 520, switch 90 is opened as illustrated by waveform end 530 of waveform 520. Thus, operating current is disconnected from DC/DC converter 110, and the attendant noise and high value input capacitance is removed. Waveform end 530 is shown falling to a level equivalent to that of the first current level of waveform 610, however this is not meant to be limiting in any way. Waveform 530 may be reduced to a higher or lower level than the first current level of waveform 610 without exceeding the scope of the invention. Preferably, waveform 530 arrives at a stable operating level prior to further communication.

Waveform 640 represents data communication from powered device interface circuit 80 to PSE 40 via a plurality of current levels, of which 3 current levels are illustrated. Preferably communication begins after waveform end 530 has achieved a quiescent stable operation level. It is to be noted that one of the plurality of current levels is illustrated as being zero, with the other 2 current levels being above 10 mA, thus ensuring a valid MPS component, however this is not meant to be limiting in any way. Any one or more of the current levels may be less than 10 mA, zero, or negative without exceeding the scope of the invention. Preferably the timing and average current of waveform 640 ensures a valid MPS component. In an exemplary embodiment communication as represented by waveform 640 is of a duration less than 300 ms, thus a valid MPS component is ensured by valid powered device circuitry having a power draw in excess of 10 mA. In the exemplary embodiment shown, PSE 40 is operational to detect communication at the plurality of current levels.

Data communication from powered device interface circuit 80 to PSE 40 is illustrated during waveform 640 as being in a unilateral direction, however this is not meant to be limiting in any way. PSE 40 may also communication with data interface circuit 80 without exceeding the scope of the invention. It is to be understood that powered device interface circuit 80 sinks any current and thus minimizing current flow during the communication period as illustrated by waveform 640 is desirable.

After completion of communication as illustrated by waveform 640, operating current is again supplied to DC/DC converter 110 by closing switch 90 thereby supplying power to powered device operating circuitry 100 as illustrated by second waveform 375 and waveform 380. Second waveform 375 and waveform 380 are in all respects similar to waveforms 375 and 380 of FIG. 2*b*, and illustrate typical operating current flows.

Figure 5A:
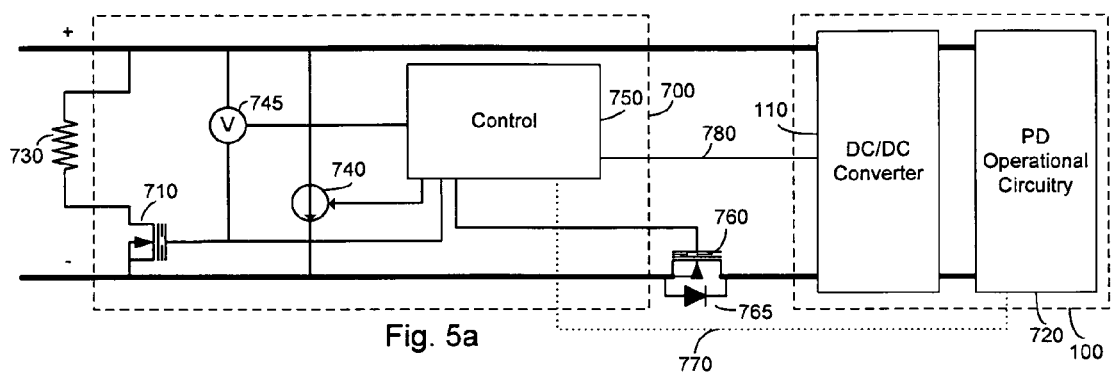
FIG. 5a illustrates a high level block diagram of a first embodiment of a powered device interface circuit, switch and associated powered device operating circuitry in accordance with the principle of the current invention.

FIG. 5*a* illustrates a high level block diagram of a first embodiment of a powered device interface circuit 700, switch 760 and associated powered device operating circuitry 100 in accordance with the principle of the current invention. Powered device interface circuit 700 comprises switch 710 illustrated as a FET switch, signature impedance 730, controllable current source 740; voltage sensor 745, control circuit 750 and a positive and negative power lead. Switch 90 of FIGS. 1*a*–1*c* is illustrated as an N-MOS FET switch 760 exhibiting parasitic diode 765, however this is not meant to be limiting in any way, and switch 760 may be any remote operated switch. Powered device operating circuitry 100 comprises DC/DC converter 110 and PD operational circuitry 720. A positive power lead and a negative power lead are shown; the positive and negative power leads being operatively connected over communication cabling 60 to PSE 40 (not shown) as described above in relation to FIGS. 1*a*–1*c*. In an exemplary embodiment polarity is ensured through the use of diode bridges. PD operational circuitry 720 is also known as host circuitry.

Switch 710 is connected to enable the presentation of signature impedance 730 across the positive and negative power leads by control circuit 750. Controllable current source 740 is connected across the positive and negative power leads, and is operable by control circuit 750. In an exemplary embodiment, the value of the current which may be transmitted by controllable current source 740 is a function of a resistance, $R_{class}$ (not shown). Voltage sensor 745 is connected across the positive and negative power leads and the output of voltage sensor 745 is connection to control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits a power good signal 780, connected to DC/DC converter 110.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during operation of PD operational circuitry 720. During the optional classification phase described above in relation to FIGS. 2*a*–4*b*, control circuit 750 operates controllable current source 740 to exhibit a predetermined current to PSE 40 across the positive and negative power leads. After completion of the classification phase, control circuit 750 turns off controllable current source 740.

Control circuit 750 senses operating voltage exceeding $V_{on}$ via voltage sensor 745, and operates controllable current source 740 to generate a plurality of current levels as illustrated by waveforms 510 and 540 of FIG. 4a, thus enabling communication. Thus, a single controllable current source is used for both classification and communication.

Operating current to DC/DC converter 110 is provided by control circuit 750 closing switch 760. Power good signal 780 enables DC/DC converter 110. The output of DC/DC converter 110 is fed to PD operational circuitry 720. Communication of data from PD operational circuitry 720 to control circuit 750 is provided by optional data path 770. As will be described further hereinto below, and preferably in relation to the second embodiment illustrated above in relation to FIGS. 4a and 4b, after start up of PD operational circuitry 720 data is provided from PD operational circuitry 720 to control circuit 750 via optional data path 770. The information provided to control circuit 750 from PD operational circuitry 720 is ultimately to be transmitted to PSE 40 as illustrated by waveforms 540, 640 of FIGS. 4a, 4b. In an exemplary embodiment power good signal 780 maintains operation of DC/DC converter 110 after the opening of switch 760 to discharge the input capacitance of DC/DC converter 110. Preferably a feedback path notifies control circuit 750 of the discharge state of the input capacitance of DC/DC converter 110, thus control circuit 750 disables power good signal 780 after discharge of the input capacitance of DC/DC converter 110. In another embodiment, power good signal 780 is maintained for a fixed time period. The term opening of the switch is meant to include any state of the switch in which there is no appreciable current flow.

Figure 5B:
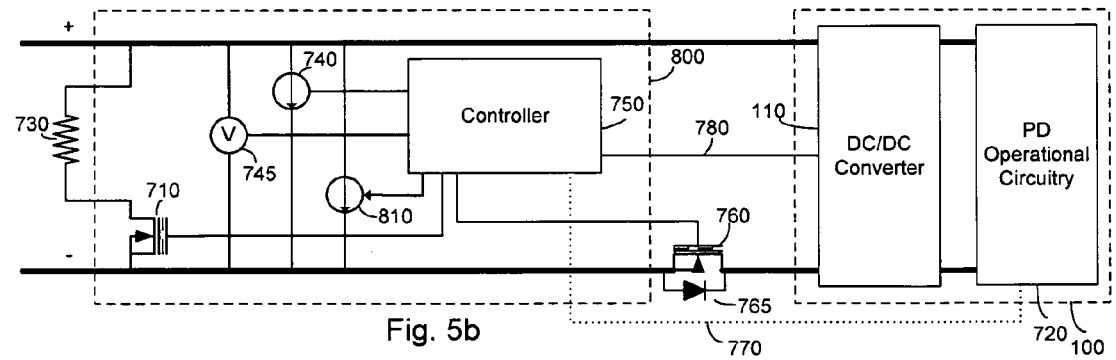
FIG. 5b illustrates a high level block diagram of a second embodiment of a powered device interface circuit, switch and associated powered device operating circuitry in accordance with the principle of the current invention.

FIG. 5b illustrates a high level block diagram of a second embodiment of a powered device interface circuit 800, switch 760 and associated powered device operating circuitry 100 in accordance with the principle of the current invention. Powered interface circuit 800 comprises switch 710 illustrated as a FET switch, signature impedance 730, controllable current source 740; voltage sensor 745; variable current source 810; control circuit 750 and a positive and negative power lead. Switch 90 of FIGS. 1a–1c is illustrated as N-MOS FET switch 760 exhibiting parasitic capacitance 765, however this is not meant to be limiting in any way, and switch 760 may be any remote operated switch. Powered device operating circuitry 100 comprises DC/DC converter 110 and PD operational circuitry 720. A positive power lead and a negative power lead are shown; the positive and negative power leads being operatively connected over communication cabling 60 to PSE 40 (not shown) as described above in relation to FIGS. 1a–1c. In an exemplary embodiment polarity is ensured through the use of diode bridges.

Switch 710 is connected to enable the presentation of signature impedance 730 across the positive and negative power leads by control circuit 750. Controllable current source 740 is connected across the positive and negative power leads, and is operable by control circuit 750. In an exemplary embodiment, the value of the current which may be transmitted by controllable current source 740 is a function of a resistance, $R_{class}$ (not shown). Voltage sensor 745 is connected across the positive and negative power leads and the output of voltage sensor 745 is connection to control circuit 750. Variable current source 810 is connected across the positive and negative power leads, and the control input of variable current source 810 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits a power good signal 780, connected to DC/DC converter 110.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a–4b, control circuit 750 operates controllable current source 740 to generate the appropriate classification current, typically selectable by an external resistor (not shown).

Control circuit 750 senses operating voltage exceeding $V_{on}$ via voltage sensor 745, and operates variable current source 810 to generate a plurality of current levels thus enabling communication as illustrated by respective waveforms 420, 450, 510, 540, 610 and 640 of FIGS. 3a–4b. Variable current source 810 may provide any number of levels of current.

Operating current to DC/DC converter 110 is provided by control circuit 750 closing switch 760. Power good signal 780 enables DC/DC converter 110. The output of DC/DC converter 110 is fed to PD operational circuitry 720. Communication of data from PD operational circuitry 720 to control circuit 750 is provided by optional data path 770. As will be described further hereinto below, and preferably in relation to the second embodiment illustrated above in relation to FIGS. 4a and 4b, after start up of PD operational circuitry 720 data is provided from PD operational circuitry 720 to control circuit 750 via optional data path 770. The information provided to control circuit 750 from PD operational circuitry 720 is ultimately to be transmitted to PSE 40 as illustrated by waveforms 540, 640 of FIGS. 4a, 4b. In an exemplary embodiment power good signal 780 maintains operation of DC/DC converter 110 after the opening of switch 760 to discharge the input capacitance of DC/DC converter 110. Preferably a feedback path notifies control circuit 750 of the discharge state of the input capacitance of DC/DC converter 110, thus control circuit 750 disables power good signal 780 after discharge of the input capacitance of DC/DC converter 110. In another embodiment, power good signal 780 is maintained for a fixed time period.

Figure 5C:
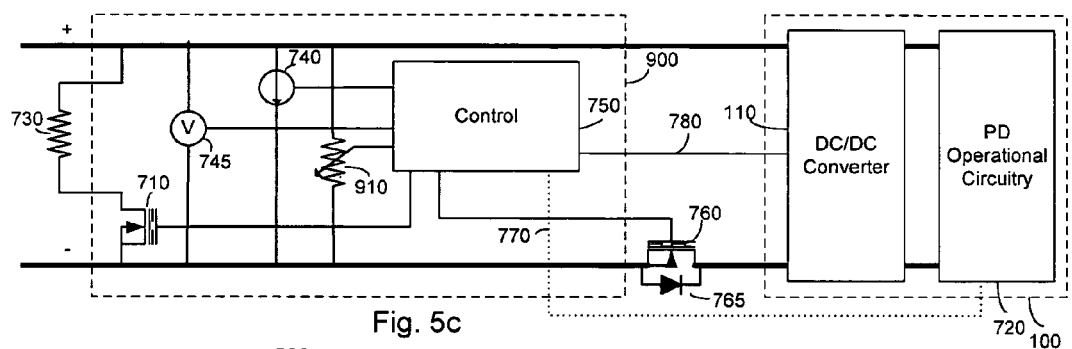
FIG. 5c illustrates a high level block diagram of a third embodiment of a powered device interface circuit, switch and associated powered device operating circuitry in accordance with the principle of the current invention.

FIG. 5c illustrates a high level block diagram of a third embodiment of a powered device interface circuit 900, switch 760 and associated powered device operating circuitry 100 in accordance with the principle of the current invention. Powered interface circuit 900 comprises switch 710 illustrated as a FET switch, signature impedance 730, controllable current source 740; voltage sensor 745; variable impedance 910; control circuit 750 and a positive and negative power lead. Switch 90 of FIGS. 1a–1c is illustrated as N-MOS FET switch 760 exhibiting parasitic capacitance 765, however this is not meant to be limiting in any way, and switch 760 may be any remote operated switch. Powered device operating circuitry 100 comprises DC/DC converter 110 and PD operational circuitry 720. A positive power lead and a negative power lead are shown; the positive and negative power leads being operatively connected over communication cabling 60 to PSE 40 (not shown) as described above in relation to FIGS. 1a–1c. In an exemplary embodiment polarity is ensured through the use of diode bridges.

Switch 710 is connected to enable the presentation of signature impedance 730 across the positive and negative power leads by control circuit 750. Controllable current source 740 is connected across the positive and negative power leads, and is operable by control circuit 750. In an exemplary embodiment, the value of the current which may be transmitted by controllable current source 740 is a function of a resistance, $R_{class}$ (not shown). Voltage sensor 745 is connected across the positive and negative power leads and the output of voltage sensor 745 is connection to control circuit 750. Variable impedance 910 is connected across the positive and negative power leads, and the control input of variable impedance 910 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits a power good signal 780, connected to DC/DC converter 110.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a–4b, control circuit 750 operates controllable current source 740 to generate the appropriate classification current.

Control circuit 750 senses operating voltage exceeding $V_{on}$ via voltage sensor 745, and operates variable impedance 910 to generate a plurality of current levels in cooperation with power being supplied by PSE 40, thus enabling communication as illustrated by respective waveforms 420, 450, 510, 540, 610 and 640 of FIGS. 3a–4b. Variable impedance 910 may provide any number of levels of current.

Operating current to DC/DC converter 110 is provided by control circuit 750 closing switch 760. Power good signal 780 enables DC/DC converter 110. The output of DC/DC converter 110 is fed to PD operational circuitry 720. Communication of data from PD operational circuitry 720 to control circuit 750 is provided by optional data path 770. As will be described further hereinto below, and preferably in relation to the second embodiment illustrated above in relation to FIGS. 4a and 4b, after start up of PD operational circuitry 720 data is provided from PD operational circuitry 720 to control circuit 750 via optional data path 770. The information provided to control circuit 750 from PD operational circuitry 720 is ultimately to be transmitted to PSE 40 as illustrated by waveforms 540, 640 of FIGS. 4a, 4b. In an exemplary embodiment power good signal 780 maintains operation of DC/DC converter 110 after the opening of switch 760 to discharge the input capacitance of DC/DC converter 110. Preferably a feedback path notifies control circuit 750 of the discharge state of the input capacitance of DC/DC converter 110, thus control circuit 750 disables power good signal 780 after discharge of the input capacitance of DC/DC converter 110. In another embodiment, power good signal 780 is maintained for a fixed time period.

Figure 5D:
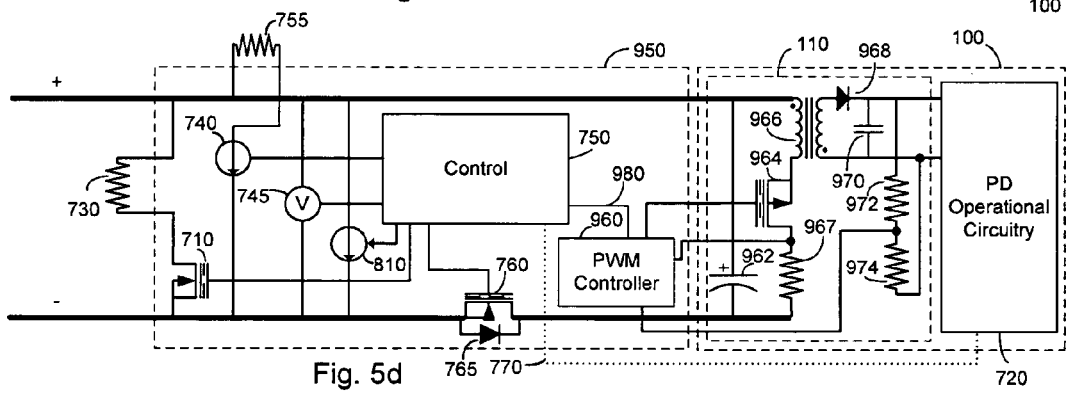
FIG. 5d illustrates a high level block diagram of a fourth embodiment of a powered device interface circuit, switch and associated powered device operating circuitry in accordance with the principle of the current invention.

FIG. 5d illustrates a high level block diagram of a fourth embodiment of a powered device interface circuit 950 comprising switch 760, and associated powered device operating circuitry 100 in accordance with the principle of the current invention. Powered interface circuit 950 comprises switch 710 illustrated as a FET switch, controllable current source 740, voltage sensor 745; variable current source 810, control circuit 750, switch 760 illustrated as an N-MOS FET switch exhibiting parasitic capacitance 765, and PWM or resonance controller 960. A signature impedance 730 and classification resistor 755 are externally connected to powered device interface circuit 950. Switch 90 of FIGS. 1a–1c is illustrated as internal FET switch 760, however this is not meant to be limiting in any way, and FET switch 760 may be any remote operated switch. A positive power lead and a negative power lead are shown; the positive and negative power leads being operatively connected over communication cabling 60 to PSE 40 (not shown) as described above in relation to FIGS. 1a–1c. In an exemplary embodiment polarity is ensured through the use of diode bridges.

Powered device operating circuitry 100 comprises DC/DC converter 110 and PD operational circuitry 720. DC/DC converter 110 comprises input capacitor 962; switch 964 illustrated as a FET switch; sense resistance 967; flyback transformer 966; diode 968; output capacitor 970; and feedback resistors 972 and 974. Switch 964 is illustrated as a FET switch however this is not meant to be limiting in any way, and switch 964 may be any remote operated switch. It is to be noted that PWM or resonance controller 960 is normally part of DC/DC converter 110, and in this implementation has been placed within powered device interface circuit 950.

Switch 710 is connected to enable the presentation of signature impedance 730 across the positive and negative power leads by control circuit 750. Controllable current source 740 is connected across the positive and negative power leads, and is operable by control circuit 750. The value of the current which may be transmitted by controllable current source 740 is a function of classification resistor 755. Voltage sensor 745 is connected across the positive and negative power leads and the output of voltage sensor 745 is connection to control circuit 750. Variable current source 810 is connected across the positive and negative power leads, and the control input of variable current source 810 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. Optionally, a data path 770 between PD operational circuitry 720 and control circuit 750 is provided. Preferably, optional data path 770 includes isolation circuitry such as an opto-isolator or transformer. Control circuit 750 exhibits a communication path 980 to PWM or resonance controller 960.

DC/DC converter 110 is illustrated as being a non-isolated flyback topology, however this is not meant to be limiting in any way. Other topologies, including, but not limited to, forward, push-pull and bridge are specifically meant to be included without exceeding the scope of the invention. Each of the above topologies may be supplied either isolated or non-isolated without exceeding the scope of the invention. Input capacitor 962, which in an exemplary embodiment comprises an electrolytic capacitor valued between 47 µf and 470 µf, is connected across the positive and negative power leads at the input of DC/DC converter 110. The primary of flyback transformer 966 is connected through switch 964 and sense resistance 967 across the negative and positive power leads. Switch 964 is operatively connected to an output of PWM or resonance controller 960. The voltage generated across sense resistance 967 is connected as an input to PWM or resonance controller 960. The secondary of flyback transformer 966 is connected through diode 968 as the power input to PD operational circuitry 720. Output capacitor 970 is connected across the output of DC/DC converter 110. Feedback resistors 972 and 974 form a voltage divider across the output of DC/DC converter 110, and the divided output is connected to an input of PWM or resonance controller 960. In the event that an isolated topology is utilized, the divided output from feedback resistors 972 and 974 is fed through an appropriate isolator to an input of PWM or resonance controller 960.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a–4b, control circuit 750 operates controllable current source 740 to present the appropriate classification current across the positive and negative power leads.

Control circuit 750 senses operating voltage exceeding $V_{on}$ via voltage sensor 745, and operates variable current source 810 to generate a plurality of current levels thus enabling communication as illustrated by respective waveforms 420, 450, 510, 540, 610 and 640 of FIGS. 3a–4b. Variable current source 810 may provide any number of levels of current.

Operating current to DC/DC converter 110 is provided by control circuit 750 closing switch 760. Control circuit 750 enables PWM or resonance controller 960 via communication path 980. PWM or resonance controller 960 pulses switch 964 to generate an appropriate voltage output of DC/DC converter 110 to be fed to PD operational circuitry 720. Advantageously, communication path 980 is bidirectional, thus PWM or resonance controller 960 which acts as a portion of DC/DC converter 110 is in communication with control circuit 750.

Communication of data from PD operational circuitry 720 to control circuit 750 is provided by optional data path 770. In one embodiment optional data path 770 is provided with isolation. As will be described further hereinto below, and preferably in relation to the second embodiment illustrated above in relation to FIGS. 4a and 4b, after start up of PD operational circuitry 720 data is provided from PD operational circuitry 720 to control circuit 750 via optional data path 770. The information provided to control circuit 750 from PD operational circuitry 720 is ultimately to be transmitted to PSE 40 as illustrated by waveforms 540 640 of FIGS. 4a, 4b.

It is to be noted that during shut off of FET switch 760 a parasitic path for discharge of input capacitor 962 is present through parasitic diode 765. Preferably, control circuit 750 maintains the operation of PWM or resonance controller 960 via communication path 980 after opening FET switch 760 so as discharge input capacitor 962. In particular, control circuit 750 operates PWM or resonance controller 960 despite the shut off of FET switch 760, and preferably maintains operation of PWM or resonance controller 960 as long as is practicable. Voltage sense inputs of PWM or resonance controller 960 are in one embodiment transmitted to control circuit 750 via communication path 980 thus enabling control circuit 750 to maintain the operation of PWM or resonance controller 960 only until discharge of capacitor 960. Advantageously, in the event of a loss of power from PSE 40, the operation of PWM or resonance controller 960 is maintained after opening switch 760, thus discharging input capacitor 962. Discharging input capacitor 962 acts to ensure that residual voltage across input capacitor 962 does not interfere with a future detection cycle.

Preferably, control circuit 750 operates controllable current source 740 during shut down of power from PSE 40, thus advantageously discharging any capacitance across the input of powered device interface circuitry 950. Furthermore, the operation of controllable current source 740 during shut down of power from PSE 40 acts to discharge input capacitor 962. Preferably, control circuit 750 operates switch 710 during shut down of power from PSE 40, thus advantageously discharging any capacitance across the input of powered device interface circuitry 950 through impedance 720. Furthermore, the operation of switch 710 during shut down of power from PSE 40 acts to discharge input capacitor 962.

Preferably, the rapid discharge of input capacitor 962 enhances the slope of discharge as illustrated by waveforms 530, 630 of FIGS. 4a and 4b. Thus, the discharge of input capacitor 962 advantageously enables early communication as illustrated by waveforms 540, 640 of FIGS. 4a, and 4b by removing any stray currents from the communication loop. In one embodiment the discharge of input capacitor 962 requires approximately 1 second. Preferably, during discharge of input capacitor 962 control circuit 750 ensures a valid MPS through the operation of variable current source 810.

Figure 5E:
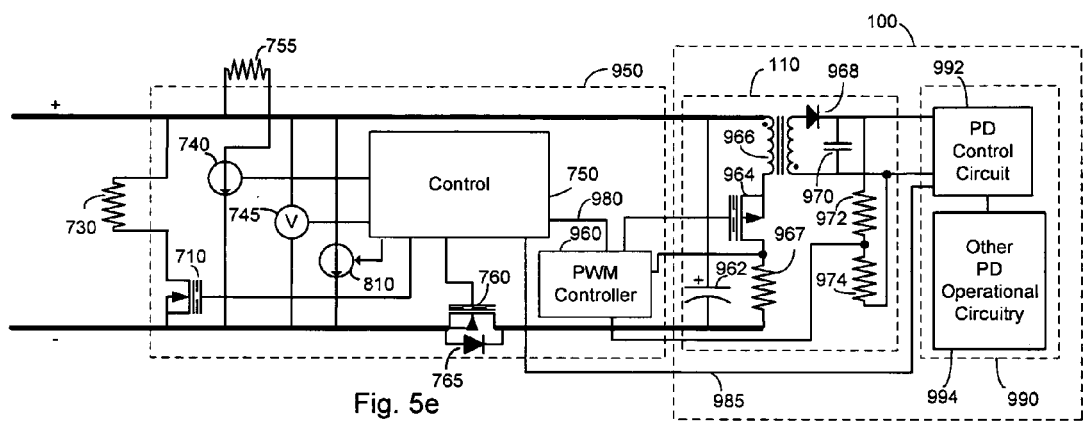
FIG. 5e illustrates a high level block diagram of a fifth embodiment of a powered device interface circuit, switch and associated powered device operating circuitry in accordance with the principle of the current invention.

FIG. 5e illustrates a high level block diagram of a fifth embodiment of a powered device interface circuit 950 comprising switch 760, and associated powered device operating circuitry 100 in accordance with the principle of the current invention. Powered interface circuit 950 comprises switch 710 illustrated as a FET switch 710, controllable current source 740, voltage sensor 745, variable current source 810, control circuit 750, switch 760 illustrated as FET switch 760, and PWM or resonance controller 960. A signature impedance 730 and classification resistor 755 are externally connected to powered device interface circuit 950. Switch 90 of FIGS. 1a–1c is illustrated as internal N-MOS FET switch 760 exhibiting parasitic capacitance 765, however this is not meant to be limiting in any way, and switch 760 may be any remote operated switch. A positive power lead and a negative power lead are shown; the positive and negative power leads being operatively connected over communication cabling 60 to PSE 40 (not shown) as described above in relation to FIGS. 1a–1c. In an exemplary embodiment polarity is ensured through the use of diode bridges.

Powered device operating circuitry 100 comprises DC/DC converter 110 and PD operational circuitry 990. DC/DC converter 110 comprises input capacitor 962; switch 964 illustrated as FET switch 964; sense resistance 967; flyback transformer 966; diode 968; output capacitor 970; and feedback resistors 972 and 974. Switch 964 is illustrated as a FET switch however this is not meant to be limiting in any way, and switch 964 may be any remote operated switch. It is to be noted that PWM or resonance controller 960 is normally part of DC/DC converter 110, and in this implementation has been placed within powered device interface circuit 950. PD operational circuitry 990 comprises PD control circuit 992 and other PD operational circuitry 994.

Switch 710 is connected to enable the presentation of signature impedance 730 across the positive and negative power leads by control circuit 750. Controllable current source 740 is connected across the positive and negative power leads and is operable by control circuit 750. The value of the current which may be transmitted by controllable current source 740 is a function of classification resistor 755. Voltage sensor 745 is connected across the positive and negative power leads and the output of voltage sensor 745 is connection to control circuit 750. Variable current source 810 is connected across the positive and negative power leads, and the control input of variable current source 810 is connected to an output of control circuit 750. Switch 760 is connected to enable connection of the negative power lead to the negative power input of DC/DC converter 110 by control circuit 750. The positive power lead is connected to the positive power input of DC/DC converter 110. The power output of DC/DC converter 110 is connected to PD operational circuitry 720. A data path 985 between PD control circuit 992 and control circuit 750 is provided. Preferably, data path 985 includes isolation circuitry such as an opto-isolator or transformer. Control circuit 750 exhibits a communication path 980 to PWM or resonance controller 960.

DC/DC converter 110 is illustrated as being a non-isolated flyback topology, however this is not meant to be limiting in any way. Other topologies, including, but not limited to, forward, push-pull and bridge are specifically meant to be included without exceeding the scope of the invention. Each of the above topologies may be supplied either isolated or non-isolated without exceeding the scope of the invention. Input capacitor 962, which in an exemplary embodiment comprises an electrolytic capacitor valued between 47 µf and 470 µf, is connected across the positive and negative power leads at the input of DC/DC converter 110. The primary of flyback transformer 966 is connected through switch 964 and sense resistance 967 across the negative and positive power leads. Switch 964 is operatively connected to an output of PWM or resonance controller 960. The voltage generated across sense resistance 967 is connected as an input to PWM or resonance controller 960. The secondary of flyback transformer 966 is connected through diode 968 as the power input to PD operational circuitry 720. Output capacitor 970 is connected across the output of DC/DC converter 110. Feedback resistors 972 and 974 form a voltage divider across the output of DC/DC converter 110, and the divided output is connected to an input of PWM or resonance controller 960. In the event that an isolated topology is utilized, the divided output from feedback resistors 972 and 974 is fed through an appropriate isolator to an input of PWM or resonance controller 960.

The output of DC/DC converter 110 is fed to PD operational circuitry 990. PD control circuit 992 is operational to enable other PD operational circuitry 994.

In operation, control circuit 750 operates switch 710 during the detection phase to present signature impedance 730 across the positive and negative power leads. Signature impedance 730 presents a valid signature impedance to PSE 40. After completion of the detection phase, control circuit 750 opens switch 710, thereby preventing signature impedance 730 from acting as a load during the operation of PD operational circuitry 720. During the optional classification phase described above in relation to FIGS. 2a–4b, control circuit 750 operates controllable current source 740 to present the appropriate classification current across the positive and negative power leads. The value of variable current source 740 is set in accordance with classification resistance 755.

Control circuit 750 senses operating voltage exceeding $V_{on}$ via voltage sensor 745, and operates variable current source 810 to generate a plurality of current levels thus enabling communication as illustrated by respective waveforms 420, 450, 510, 540, 610 and 640 of FIGS. 3a–4b. Variable current source 810 may provide any number of levels of current.

Operating current to DC/DC converter 110 is provided by control circuit 750 closing switch 760. Control circuit 750 enables PWM or resonance controller 960 via communication path 980. PWM or resonance controller 960 operates switch 964 to generate an appropriate voltage output of DC/DC converter 110 to be fed to PD operational circuitry 720. Advantageously, communication path 980 is bi-directional, thus PWM or resonance controller 960 which acts as a portion of DC/DC converter 110 is in communication with control circuit 750.

Communication of data from PD control circuit 992 to control circuit 750 is provided by data path 985. In one embodiment data path 980 is provided with isolation. In another embodiment, data path 985 comprises a bi-directional data path such as a UART communication path. As will be described further hereinto below in relation to FIG. 6c, and preferably in relation to the second embodiment illustrated above in relation to FIGS. 4a and 4b, after start up of PD control circuit 992 data is provided from PD control circuit 992 to control circuit 750 via data path 985. The information provided to control circuit 750 from PD control circuit 992 is ultimately to be transmitted to PSE 40 as illustrated by waveforms 540, 640 of FIGS. 4a, 4b.

In one embodiment, PD control circuit 992 does not energize other PD operational circuitry 994 until after data has been communicated to control circuit 750 and transmitted to PSE 40. In an exemplary embodiment, this is accomplished by a first turn on of power to powered device operating circuitry 100; data communication from PD control circuit 992 to control circuit 750; disconnection of power by control circuit 750 from powered device operating circuitry 100; communication from control circuit 750 to PSE 40; and the reconnection of power by control 750 to powered device operating circuitry 100. Thus, in one embodiment, during start up of PD control circuit 992 through the reconnection of power, control circuit 750 monitors power consumption and ensures a valid MPS through the operation of variable current source 810. In an exemplary embodiment, information regarding the value of current sensed by sense resistance 967 input to PWM or resonance controller 960 is communicated via communication path 980 to control circuit 750 as an indication of power consumption of powered device operating circuitry 100.

It is to be noted that during shut off of FET switch 760 a parasitic path for discharge of input capacitor 962 is present through FET switch 760. Preferably, control circuit 750 maintains the operation of PWM or resonance controller 960 via communication path 980 after opening FET switch 760 so as discharge input capacitor 962. In particular, control circuit 750 operates PWM or resonance controller 960 despite the shut off of FET switch 760, and preferably maintains operation of PWM or resonance controller 960 as long as is practicable. Voltage sense inputs of PWM or resonance controller 960 are in one embodiment transmitted to control circuit 750 via communication path 980 thus enabling control circuit 750 to maintain the operation of PWM or resonance controller 960 only until discharge of capacitor 960. Advantageously, in the event of a loss of power from PSE 40, the operation of PWM or resonance controller 960 is maintained after opening switch 760, thus discharging input capacitor 962. Discharging input capacitor 962 acts to ensure that residual voltage across input capacitor 962 does not interfere with a future detection cycle.

Preferably, control circuit 750 operates controllable current source 740 during shut down of power from PSE 40, thus advantageously discharging any capacitance across the input of powered device interface circuitry 950. Furthermore, the operation of controllable current source 740 during shut down of power from PSE 40 acts to discharge input capacitor 962. Preferably, control circuit 750 operates switch 710 during shut down of power from PSE 40, thus advantageously discharging any capacitance across the input of powered device interface circuitry 950 through impedance 720. Furthermore, the operation of switch 710 during shut down of power from PSE 40 acts to discharge input capacitor 962.

Preferably, the rapid discharge of input capacitor 962 enhances the slope of discharge as illustrated by waveforms 530, 630 of FIGS. 4a and 4b. Thus, the discharge of input capacitor 962 advantageously enables early communication as illustrated by waveforms 540, 640 of FIGS. 4a, and 4b by removing any stray currents from the communication loop. Preferably, during discharge of input capacitor 962 control circuit 750 ensures a valid MPS through the operation of variable current source 810.

Figure 6A:
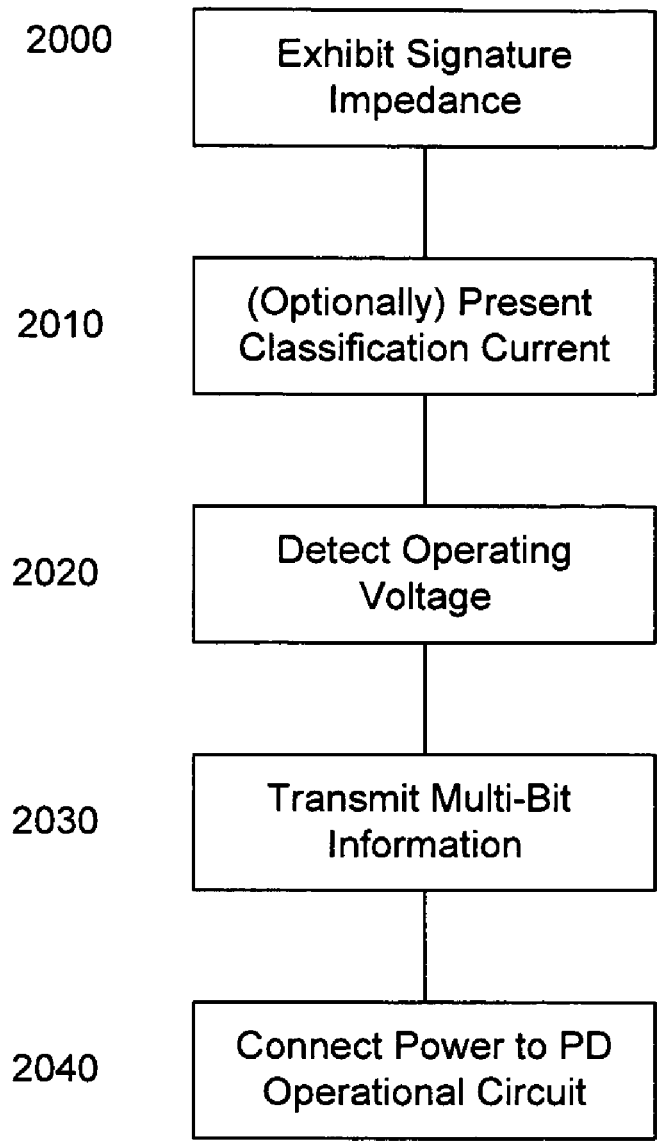
FIG. 6a illustrates a high level flow chart of a first embodiment of the operation of the controller of FIGS. 5a–5e in accordance with the principle of the current invention.

FIG. 6a illustrates a high level flow chart of a first embodiment of the operation of control circuit 750 of FIGS. 5a–5e in accordance with the principle of the current invention. In stage 2000, a signature impedance, such as signature impedance 730, is presented to PSE 40. As indicated above, after completion of the signature phase, preferably control circuit 750 removes signature impedance 730 from the circuit by opening switch 710. In stage 2010, optionally an appropriate classification current is presented to PSE 40. In an exemplary embodiment this is accomplished by controllable current source 740.

In stage 2020, operating voltage such as that described above in relation to waveform 340 of FIG. 2a is detected by voltage sensor 745. In prior art implementations, switch 90 would be closed in response thereby enabling DC/DC converter 110. In the subject invention respective switches 90, 760 remains open thus inhibiting and delaying the operation of DC/DC converter 110. In stage 2030, multi-bit information is transmitted by utilizing a plurality of current levels. Preferably as part of stage 2030, configuration information is first collected by the control circuit prior to transmission. In one embodiment, as described above in relation to powered device interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to powered device interface circuitry 800 of FIG. 5b, the plurality of current levels are generated by control circuit 750 operating variable current source 810. In yet another embodiment, as described above in relation to powered device interface circuitry 900 of FIG. 5c, the plurality of current levels are generated by control circuit 750 operating variable impedance 910. In one embodiment multi-bit communication is transmitted over an interval less than 300 ms, thus a valid MPS is presented by the operation of PD operational circuitry 720 after the closing of switch 760. In another embodiment the timing and current levels of communication by variable current source 810 and variable impedance 910, respectively, is pre-designed to ensure a valid MPS.

After communication between control circuit 750 and PSE 40 is completed in accordance with stage 2030, in stage 2040, power is connected to PD operational circuitry 720. Preferably, control circuit 750 closes FET switch 760 thereby powering DC/DC converter 110. DC/DC converter 110 outputs power to PD operational circuitry 720 thereby enabling operation.

Figure 6B:
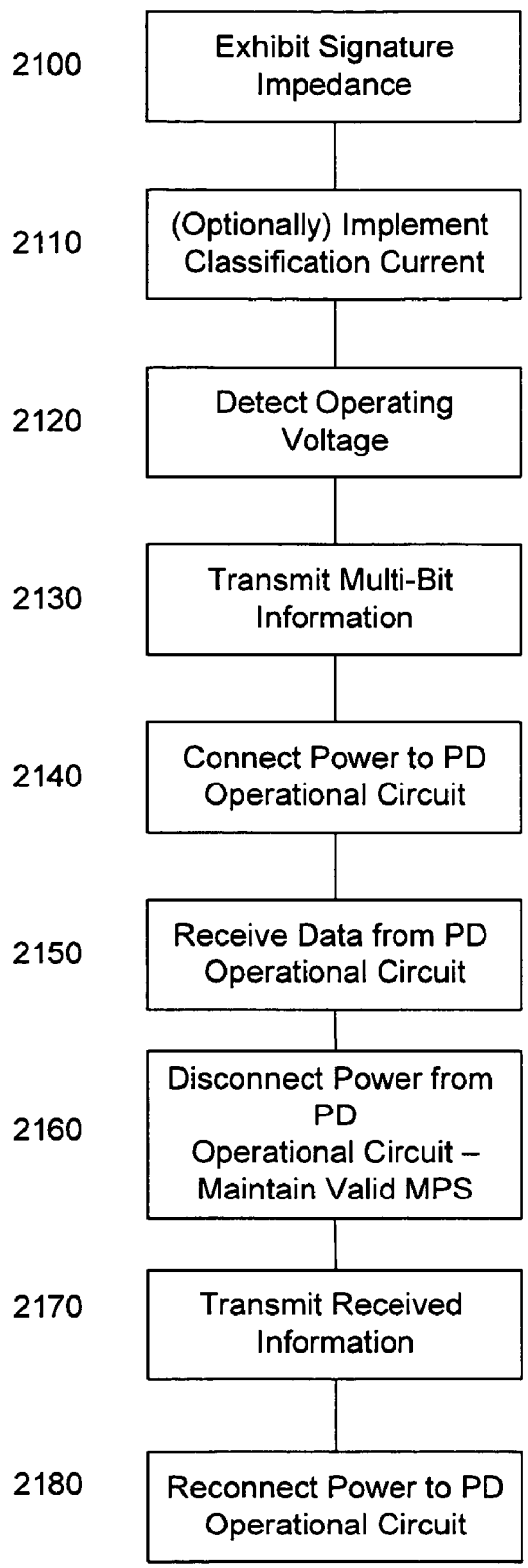
FIG. 6b illustrates a high level flow chart of a second embodiment of the operation of the controller of FIGS. 5a–5e in accordance with the principle of the current invention.

FIG. 6b illustrates a high level flow chart of a second embodiment of the operation of the controller of FIGS. 5a–5e in accordance with the principle of the current invention. In stage 2100, a signature impedance, such as signature impedance 730, is presented to PSE 40. As indicated above, after completion of the signature phase, preferably control circuit 750 removes signature impedance 730 from the circuit by opening switch 710. In stage 2110, optionally an appropriate classification current is presented to PSE 40. In an exemplary embodiment this is accomplished by controllable current source 740.

In stage 2120, operating voltage such as that described above in relation to waveform 340 of FIG. 2a is detected. In prior art implementations, switch 90 would be closed in response thereby enabling DC/DC converter 110. In the subject invention respective switches 90, 760 remains open thus inhibiting and delaying the operation of DC/DC converter 110. In stage 2130, multi-bit information is transmitted by utilizing a plurality of current levels. Preferably as part of stage 2030, configuration information is first collected by the control circuit prior to transmission. In one embodiment, as described above in relation to powered device interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to powered device interface circuitry 800 of FIG. 5b, the plurality of current levels are generated by control circuit 750 operating variable current source 810. In yet another embodiment, as described above in relation to powered device interface circuitry 900 of FIG. 5c, the plurality of current levels are generated by control circuit 750 operating variable impedance 910. In one embodiment multi-bit communication is transmitted over an interval less than 300 ms, thus a valid NPS is presented by the operation of PD operational circuitry 720 after the closing of switch 760. In another embodiment the timing and current levels of communication by variable current source 810 and variable impedance 910, respectively, is pre-designed to ensure a valid NPS.

After communication between control circuit 750 and PSE 40 is completed, in stage 2140 power is connected to PD operational circuitry 720. Preferably, control circuit 750 closes FET switch 760 thereby powering DC/DC converter 110. After start up, DC/DC converter 110 outputs power to PD operational circuitry 720 thereby enabling operation. As part of an initialization routine of PD operational circuitry 720, preferably data regarding PD operational circuitry 720 is transmitted over optional data path 770 to control circuit 750. Thus, in stage 2150 data is received from PD operational circuitry 720. The data received preferably comprises information regarding one or more of temperature, results of built in testing, priority of PD operational circuitry 720, type of PD operational circuitry 720 and maximum current draw of PD operational circuitry. In an exemplary embodiment, PD operational circuitry 720 comprises an I.P. telephone powered by PSE 40, and the priority is indicative of the priority for which power from PSE 40 is to be supplied. In an exemplary embodiment, current draw is monitored during stage 2150 and in the event that current draw is insufficient NPS is maintained by the operation of one of variable current source 810, controllable and variable impedance 910. In the event that valid data is not received in stage 2150 a timeout enables continuation to the next stage.

In stage 2160 power is disconnected from PD operational circuitry 720. In an exemplary embodiment, control circuit 750 opens FET switch 760 thereby disconnecting power from DC/DC converter 110. Preferably, as described above in relation to the embodiment of FIG. 5d, the input capacitance and input capacitor 962 are discharged by the operation by controller 750 of at least one of the classification current source, the signature impedance, and PWM or resonance controller 960. In an exemplary embodiment, a valid MPS is maintained during discharge of the input capacitance and input capacitor 962 by the operation of one of variable current source 810, controllable and variable impedance 910. After settling of any momentary transients, and the discharge of any input capacitance in stage 2170 multi-bit information comprising information received from PD operational circuitry 720 is transmitted to PSE 40. In the event that no valid information has been received, a null message is sent. Preferably, the multi-bit information is transmitted by utilizing a plurality of current levels. In one embodiment, as described above in relation to powered device interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to powered device interface circuitry 800 of FIG. 5b, the plurality of current levels are generated by control circuit 750 operating variable current source 810. In yet another embodiment, as described above in relation to powered device interface circuitry 900 of FIG. 5c, the plurality of current levels are generated by control circuit 750 operating variable impedance 910.

After the data is transmitted in accordance with stage 2170, in stage 2180 power is connected to PD operational circuitry 720. Preferably, control circuit 750 closes FET switch 760 thereby powering DC/DC converter 110, which outputs power to PD operational circuitry 720 thereby enabling operation.

Figure 6C:
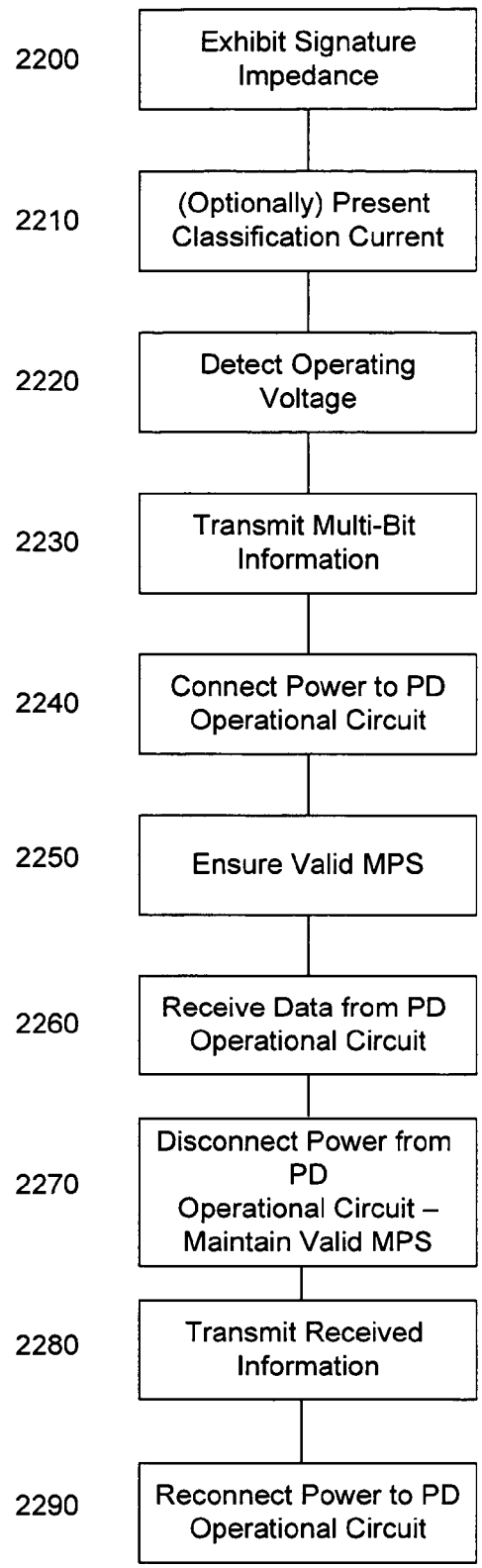
FIG. 6c illustrates a high level flow chart of an embodiment of the operation of the controller of FIG. 5e in accordance with the principle of the current invention.

FIG. 6c illustrates a high level flow chart of an embodiment of the operation of the controller of FIG. 5e in accordance with the principle of the current invention. In stage 2200, a signature impedance, such as signature impedance 730, is presented to PSE 40. As indicated above, after completion of the signature phase, preferably control circuit 750 removes signature impedance 730 from the circuit by opening switch 710. In stage 2210, optionally an appropriate classification current is presented to PSE 40. In an exemplary embodiment this is accomplished by the operation of controllable current source 740 to PSE 40.

In stage 2220, operating voltage such as that described above in relation to waveform 340 of FIG. 2a is detected. In an exemplary embodiment this is accomplished by the operation of voltage sensor 745. In prior art implementations, switch 90 would be closed in response thereby enabling DC/DC converter 110. In the subject invention respective switches 90, 760 remains open thus inhibiting and delaying the operation of DC/DC converter 110. In stage 2230, multi-bit information is transmitted by utilizing a plurality of current levels. Preferably as part of stage 2230, configuration information is first collected by the control circuit prior to transmission. In one embodiment, as described above in relation to powered device interface circuitry 700 of FIG. 5a, the plurality of current levels are generated by control circuit 750 operating switch 730 thus switching classification current source 740 alternatively across the positive and negative power leads and out of the circuit. In another embodiment, as described above in relation to powered device interface circuitry 800 of FIG. 5b, the plurality of current levels are generated by control circuit 750 operating variable current source 810. In yet another embodiment, as described above in relation to powered device interface circuitry 900 of FIG. 5c, the plurality of current levels are generated by control circuit 750 operating variable impedance 910 (not shown). In one embodiment multi-bit communication is transmitted over an interval less than 300 ms, thus a valid NPS is presented by the operation of PD operational circuitry 990 after the closing of switch 760. In another embodiment the timing and current levels of communication by variable current source 810 and variable impedance 910, respectively, is pre-designed to ensure a valid MPS.

After communication between control circuit 750 and PSE 40 is completed, in stage 2240 power is connected to PD operational circuitry 720. Preferably, control circuit 750 closes FET switch 760 thereby powering DC/DC converter 110. After start up, DC/DC converter 110 outputs power to PD operational circuitry 990 thereby enabling operation. As part of an initialization routine of PD operational circuitry 990, PD control circuit 992 prevents the operation of other PD operational circuitry 994, and transmits data regarding PD operational circuitry 990 over data path 985 to control circuit 750. In this embodiment control circuit 750 is unable to rely on PD operational circuitry 990 to provide a valid MPS, and thus in stage 2250 current draw of PD operational circuitry 990 is monitored to ensure a valid NPS. In the event that insufficient current is drawn, control circuit 750 operates one or more of switch 710, switch 730 and variable current source 810 to ensure a valid MPS.

In stage 2260 data is received from PD control circuit 992. The data received preferably comprises information regarding one or more of temperature, results of built in testing, priority of PD operational circuitry 990, type of PD operational circuitry 990 and maximum power draw of PD operational circuitry 990. In an exemplary embodiment, PD operational circuitry 990 comprises an I.P. telephone powered by PSE 40, and the priority is indicative of the priority for which power from PSE 40 is to be supplied. In the event that valid data is not received in stage 2260 a timeout enables continuation to the next stage.

In stage 2270 power is disconnected from PD operational circuitry 990. In an exemplary embodiment, control circuit 750 opens FET switch 760 thereby disconnecting power from DC/DC converter 110. Preferably, as described above, the input capacitance and input capacitor 962 are discharged by the operation by controller 750 of at least one of the classification current source, the signature impedance, and PWM or resonance controller 960. In an exemplary embodiment, a valid MPS is maintained during discharge of the input capacitance and input capacitor 962 by the operation of one of variable current source 810, controllable and variable impedance 910. After settling of any momentary transients, in stage 2280 multi-bit information comprising information received from PD control circuit 992 is transmitted to PSE 40. Preferably, the multi-bit information is transmitted by utilizing a plurality of current levels. In the event that no valid information has been received in stage 2260, a null message is transmitted. In one embodiment, as described above in relation to powered device interface circuitry 700 of FIG. 5*a*, the plurality of current levels are generated by control circuit 750 operating switch 730 thus switching classification current source 740 alternatively across the positive and negative power leads and out of the circuit. In another embodiment, as described above in relation to powered device interface circuitry 800 of FIG. 5*b*, the plurality of current levels are generated by control circuit 750 operating variable current source 810. In yet another embodiment, as described above in relation to powered device interface circuitry 900 of FIG. 5*c*, the plurality of current levels are generated by control circuit 750 operating variable impedance 910 (not shown).

After the data is transmitted in accordance with stage 2280, in stage 2290 power is connected to PD operational circuitry 720. Preferably, control circuit 750 closes FET switch 760 thereby powering DC/DC converter 110, which outputs power to PD operational circuitry 990. In one embodiment PD control circuit 992 senses the reestablishment of power, or in another embodiment receives notification from control circuit 750 over data path 985 that power is now being enabled without an immediate shut down as described above in relation to stage 2270, and enables the operation of other PD operational circuitry 994.

Figure 7A:
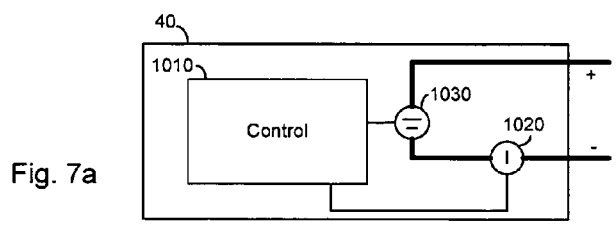
FIG. 7a illustrates an embodiment of power sourcing equipment operative to detect the communication of the current invention.

FIG. 7*a* illustrates an embodiment of PSE 40 operative to detect the communication of the current invention. PSE 40 comprises control 1010, controlled current limited power source 1030 and current sensor 1020. Current sensor 1020 is shown being connected on the return of the output from controlled current limited power source 1030 however this is not meant to be limiting in any way. Control 1010 operates controlled current limited power source 1030 in a manner as described above in relation to FIG. 2*a* to detect a compatible PD in accordance with the above standard, optionally obtain classification information and then to supply current limited power to the PD. Current sensor 1020 is operative to supply control 1010 with information regarding the amount of current being drawn by the PD. In one embodiment current sensor 1020 comprises a sense resistor in combination with a voltage comparator having at least one fixed reference voltage. In yet another embodiment current sensor 1020 comprises a sense resistor in combination with an A/D converter thereby outputting a digital representation of the amount of current.

Figure 7B:
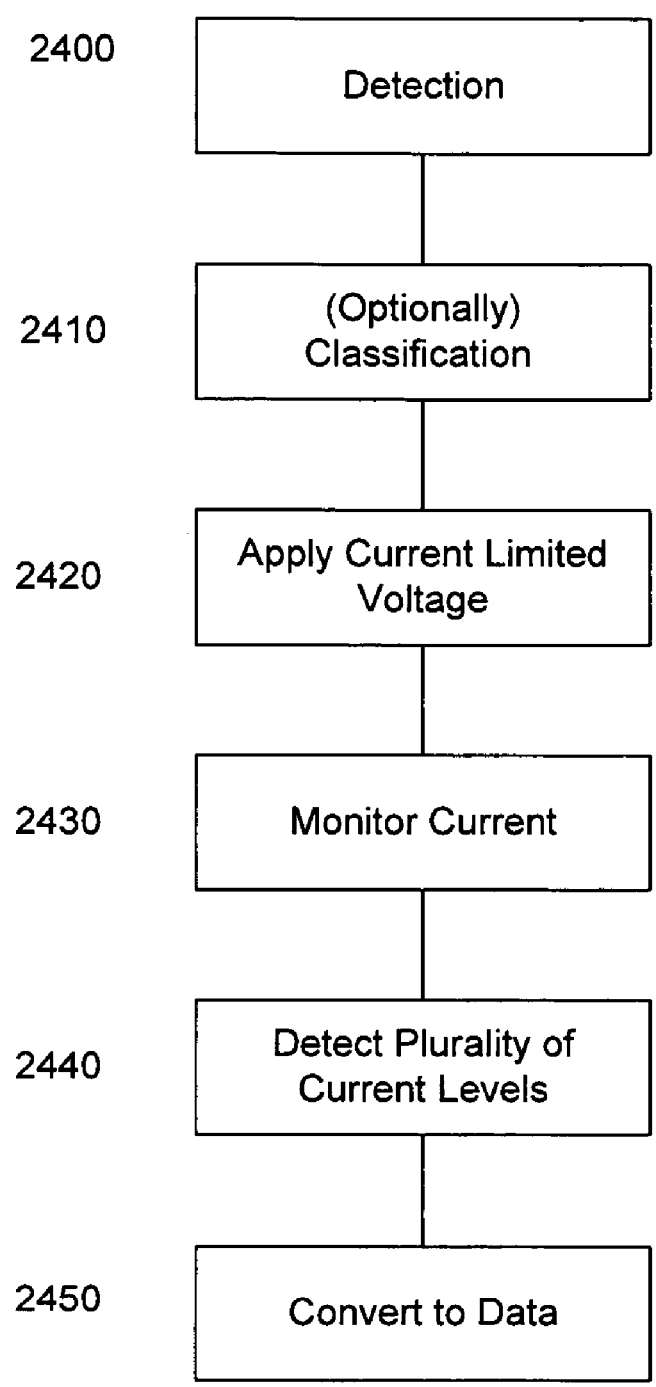

FIG. 7*b* illustrates a high level flow chart of an embodiment of the operation of the control of FIG. 7*a*. In stage 2400 detection of a compatible PD as described above in relation to waveform 310 of FIG. 2*a* is attempted. In the event that a compatible PD is detected, in stage 2410 optionally classification is attempted as described above in relation to waveform 320 of FIG. 2*a*. In stage 2420 current limited voltage is supplied to the PD as described above in relation to waveforms 330 and 340 of FIG. 2*a*.

In stage 2430 the current being consumed by the PD is monitored. In an exemplary embodiment initial communication is to occur within a pre-determined time after the application of current limited voltage. In a further exemplary embodiment the pre-determined time is 100 ms. In the event of an expected second communication as described above in relation to waveforms 540 and 640 of FIGS. 4*a* and 4*b*, preferably in the first communication the time for the second communication is transmitted by the PD. Thus, based on the data received in the first communication, communication is expected at a predetermined time.

In stage 2440 a plurality of current levels of the current monitored in stage 2430 is detected. Preferably the plurality of current levels is detected during the pre-determined periods described above. In stage 2450 the plurality of current levels detected in stage 2440 is converted to data. Thus, control 1010 receives and decodes digital multi-bit data transmitted from the PD to the PSE.

The present embodiments thus enable the transmission of information from PD interface circuitry to an associated PSE prior to supplying power to PD operational circuitry, in particular by not enabling a DC/DC converter of the PD operational circuitry. In one embodiment, communication occurs after the PSE enables the PD by supplying an appropriate voltage; however an isolating switch between the PD interface circuitry and the PD operational circuitry is kept open.

In another embodiment, subsequent to the communication, the isolating switch is closed thereby enabling the PD operational circuitry. Data is received by the PD interface circuitry from the PD operational circuitry, and then the isolating switch is again opened, thereby disabling the PD operational circuitry. Data indicative of the information received from the PD operational circuitry is then communicated by the PD interface circuitry while the PD operational circuitry is disabled. The isolating switch is subsequently again closed thereby enabling the PD operational circuitry.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A method for communicating multi-bit data from a powered device interface associated with a powered device to power sourcing equipment, the method comprising:
   exhibiting a signature indicative of a powered device to be powered over communication cabling;

sensing a voltage level indicative of remote powering over the communication cabling; and prior to connecting power to operational circuitry of said powered device, transmitting multi-bit information, responsive to said sensed voltage level, from the powered device interface to the power sourcing equipment over the communication cabling.

2. A method according to claim 1, further comprising:

subsequently to said transmitting, connecting power received over the communication cabling to said operational circuitry.

3. A method according to claim 1, wherein said transmitting multi-bit information from the powered device interface to the power sourcing equipment comprises modulating a current flow responsive to said sensed voltage level.

4. A method according to claim 3, wherein said modulating of said current flow comprises impressing at least 2 current levels, the level and timing of said at least 2 current levels being sufficient to ensure that a valid maintain power signature is detected.

5. A method according to claim 3, wherein said modulating of said current flow comprises impressing at least 3 current levels, the level and timing of said at least 3 current levels being sufficient to ensure that a valid maintain power signature is detected.

6. A method according to claim 1, wherein said multi-bit information comprises data indicative of a maximum power level.

7. A method according to claim 6, wherein said data indicative of a maximum power level exhibits a granularity of no more than 1 watt over at least a portion of the range of maximum power levels.

8. A method according to claim 1, wherein said multi-bit information comprises data indicative of temperature.

9. A method of powering a powered device from power sourcing equipment over communication cabling and communicating from an interface of the powered device to the power sourcing equipment, the method comprising:

exhibiting a signature indicative of a device to be powered over communication cabling;

sensing a voltage level indicative of remote powering over communication cabling;

transmitting multi-bit information from the powered device interface to the power sourcing equipment responsive to said sensed voltage level; and subsequently to said transmitting, connecting power received over communication cabling to powered device operational circuitry.

10. A method according to claim 9, further comprising before said sensing:

presenting a classification signature.

11. A method according to claim 9, wherein said transmitting multi-bit information comprises modulating a current flow responsive to said sensed voltage level.

12. A method according to claim 11, wherein said modulating of said current flow comprises impressing at least 2 current levels.

13. A method according to claim 12, wherein the level and timing of said impressed at least 2 current levels is sufficient to ensure that a valid maintain power signature is detected.

14. A method according to claim 11, wherein said modulating of said current flow comprises impressing at least 3 current levels.

15. A method according to claim 9, wherein said multi-bit information comprises data indicative of a maximum power level.

16. A method according to claim 9, wherein said multi-bit information comprises data indicative of temperature.

17. A method for communicating multi-bit data from a powered device being powered over communication cabling to power sourcing equipment, the method comprising:

exhibiting a signature indicative of a device to be powered over communication cabling;

sensing a voltage level indicative of remote powering over communication cabling;

prior to connecting power to operational circuitry of the powered device, transmitting first multi-bit information from the powered device to the power sourcing equipment responsive to said sensed voltage level;

subsequently to said transmitting first multi-bit information, connecting power received over the communication cabling to the powered device operational circuitry;

receiving information from the powered device operational circuitry;

disconnecting said received power from the powered device operational circuitry; and subsequent to said disconnecting, and prior to reconnecting power to said operational circuitry, transmitting second multi-bit information associated with said operational circuitry from the powered device to the power sourcing equipment, said second multi-bit information comprising at least one bit being a function of said received information.

18. A method according to claim 17, further comprising after said transmitting second multi-bit information:

re-connecting power received over the communication cabling to the operational circuitry.

19. A method according to claim 18, further comprising:

maintaining a valid maintain power signature between said disconnecting and said re-connecting.

20. A method according to claim 17, wherein at least one of said transmitting first multi-bit information and transmitting second multi-bit information comprises modulating a current flow responsive to said voltage level.

21. A method according to claim 20, wherein said modulating of said current flow comprises impressing at least 2 current levels.

22. A method according to claim 21, wherein the level and timing of said at least 2 current levels is sufficient to ensure that a valid maintain power signature is detected.

23. A method according to claim 20, wherein said modulating of said current flow comprises impressing at least 3 current levels.

24. A method according to claim 17, wherein said second multi-bit information comprises data indicative of one of temperature, results of built in testing, priority, type and maximum power draw.

25. A method according to claim 17, wherein said first multi-bit information comprises data indicative of a maximum power level.

26. A method according to claim 25, wherein said data indicative of a maximum power level exhibits a granularity of no more than 1 watt over at least a portion of the range of maximum power levels.

27. A method according to claim 17, further comprising subsequent to said disconnecting:

operating one of a pulse width modulation controller and a resonance controller to discharge an input capacitor.

28. A method according to claim 17, further comprising subsequent to said disconnecting:

operating at least one of a pulse width modulation controller, a resonance controller, said signature indicative of a powered device, and a classification signature to discharge an input capacitor.

29. A powered device interface circuit comprising:
a control circuit;
a means for exhibiting a signature impedance to power sourcing equipment connected over a communication cabling, said means for exhibiting being responsive to said control circuit;
a voltage sensor in communication with said control circuit;
an isolating switch operating means responsive to said control circuit; and
a means for transmitting multi-bit information over the communication cabling to the power sourcing equipment, said means for transmitting being responsive to said control circuit,
said control circuit being operable to transmit first multi-bit information to the power sourcing equipment over the communication cabling via said means for transmitting responsive to a predetermined voltage level sensed by said voltage sensor prior to operating said isolating switch operating means to close an isolating switch.

30. A powered device interface circuit according to claim 29, further comprising a means for exhibiting a classification signature, said classification signature being indicative of a maximum total power consumption of said powered device operational circuitry, said means for exhibiting a classification signature being responsive to said control circuit.

31. A powered device interface circuit according to claim 29, wherein said means for transmitting multi-bit information comprises a variable impedance, said control circuit being operable to vary said variable impedance thereby transmitting said first multi-bit information.

32. A powered device interface circuit according to claim 31, wherein said control circuit is operable to vary said variable impedance to at least two values.

33. A powered device interface circuit according to claim 29, wherein said means for transmitting multi-bit information comprises a variable current source, said control circuit being operable to vary said variable current source thereby transmitting said first multi-bit information.

34. A powered device interface circuit according to claim 33, wherein said control circuit is operable to vary said variable current source to at least 2 current values, the value and timing of said at least 2 current values being sufficient to ensure that a valid maintain power signature is detected.

35. A powered device interface circuit according to claim 33, wherein said controller is operable to vary said variable current source to at least 3 current values, the values and timing of said at least 3 current values being sufficient to ensure that a valid maintain power signature is detected.

36. A powered device interface circuit according to claim 29, wherein said first multi-bit information comprises data indicative of a maximum power level.

37. A powered device interface circuit according to claim 36, wherein said data indicative of a maximum power level exhibits a granularity of less than or equal to 1 watt over at least a portion of the range of available maximum power levels.

38. A powered device interface circuit according to claim 29, further comprising an operational circuitry receiving power responsive to said isolating switch operating means, wherein said control circuit is further operable to:
receive data from said operational circuitry;
disconnect said received power from said operational circuitry via said isolating switch operating means;
subsequently to said disconnecting, transmit second multi-bit information to the power sourcing equipment via said means for transmitting, said second multi-bit information comprising an indication of said received data over the communication cabling; and
subsequently to transmitting said second multi-bit information connect said received power to said operational circuitry by operating said isolating switch operating means.

39. A powered device interface circuit according to claim 38, wherein said second multi-bit information comprises data regarding one of temperature, results of built in testing, priority, maximum current draw and type.

40. A powered device interface circuit according to claim 38, further comprising a one of a pulse width modulator and a resonance controller responsive to said control circuit, wherein said control circuit is further operable to operate said one of a PWM and a resonance controller after said disconnecting via said isolating switch operating means and prior to said transmitting second multi-bit information,
whereby said one of a pulse width modulator and a resonance controller discharges an input capacitor thereby enabling said transmitting of said second multi-bit information.

41. A powered device interface circuit according to claim 38, further comprising a means for exhibiting a classification signature, said means for exhibiting being responsive to said control circuit, wherein said control circuit is further operable, after said disconnecting via said isolating switch operating means and prior to said transmitting second multi-bit information, to operate at least one of said means for exhibiting a signature impedance and said means for exhibiting a classification signature,
whereby said at least one of said means for exhibiting a signature impedance and said means for exhibiting a classification signature discharges an input capacitance thereby enabling said transmitting of said second multi-bit information.

42. A local area network comprising:
a power sourcing equipment;
a powered device; and
a communication cabling connecting said power sourcing equipment to said powered device;
said powered device comprising a powered device interface circuit comprising:
(a) a control circuit;
(b) a means for exhibiting a signature impedance to said power sourcing equipment, said means for exhibiting responsive to said control circuit to exhibit the signature impedance to said power sourcing equipment over said communication cabling, said power sourcing equipment supplying power to said powered device via said communication cabling responsive to said exhibited signature impedance; and
(c) an isolating switch responsive to said control circuit,
said control circuit being operable to transmit multi-bit information over said communication cabling to said power sourcing equipment prior to operating said isolating switch connecting said power supplied from said power sourcing equipment via said communication cabling to powered device operational circuitry.

43. A method for communicating multi-bit data from a powered device being powered over communication cabling to power sourcing equipment, the method comprising:

sensing a voltage level indicative of remote powering over communication cabling;

prior to connecting power to operational circuitry associated with the powered device, transmitting multi-bit information from the powered device to the power sourcing equipment, said transmitting being responsive to said sensed voltage level.

44. A method for communicating multi-bit data from a powered device being powered over communication cabling to power sourcing equipment, the method comprising:

exhibiting a signature indicative of a device to be powered over communication cabling;

sensing a voltage level indicative of remote powering over communication cabling;

prior to connecting power to associated operational circuitry, transmitting first multi-bit information from the powered device to the power sourcing equipment responsive to said sensed voltage level;

subsequent to said transmitting first multi-bit information, connecting power received over communication cabling to associated operational circuitry;

disconnecting said power received over the communication cabling from the associated operational circuitry; and subsequent to said disconnecting, transmitting second multi-bit information indicative of at least one characteristic of the associated operational circuitry from the powered device to the power sourcing equipment.

45. A method for communicating multi-bit data from a powered device being powered over communication cabling to power sourcing equipment, the method comprising:

sensing a voltage level indicative of remote powering over communication cabling;

prior to connecting power to associated operational circuitry, transmitting first multi-bit information from the powered device to the power sourcing equipment responsive to said sensed voltage level;

subsequent to said transmitting first multi-bit information, connecting power received over the communication cabling to the associated operational circuitry;

subsequent to said connecting power, disconnecting said power received over the communication cabling from the associated operational circuitry; and subsequent to said disconnecting, transmitting second multi-bit information indicative of at least one characteristic of the associated operational circuitry from the powered device to the power sourcing equipment, said transmitting exhibiting timing and current levels so as to ensure a valid maintain power signature.

46. An integrated circuit for use with a powered device comprising:

(a) a control circuit;

(b) a means for exhibiting a signature impedance, said means for exhibiting responsive to said control circuit; and (c) an isolating switch operating means responsive to said control circuit, said control circuit being operable to transmit multi-bit information over communication cabling to power sourcing equipment prior to operating said isolating switch operating means to connect power received from power sourcing equipment via communication cabling to powered device operational circuitry.

47. Power sourcing equipment for use with a powered device, said power sourcing equipment comprising a control, a current limited power source and a current sensor, said control being operable to:

detect a powered device;

apply a current limited power from said current limited power source to the detected powered device; and to detect during a pre-determined time period after the application of said current limited power, via said current sensor, multi-bit information transmitted from the powered device to the power sourcing equipment during said pre-determined time period.

* * * * *